(12) United States Patent
LaMothe

(10) Patent No.: US 12,262,826 B1
(45) Date of Patent: Apr. 1, 2025

(54) MULTI-FUNCTIONAL UTENSIL WITH TEMPERATURE SENSING AND DIGITAL INTERACTIVE FEATURES

(71) Applicant: Joseph Ailanti LaMothe, Livonia, MI (US)

(72) Inventor: Joseph Ailanti LaMothe, Livonia, MI (US)

( * ) Notice: Subject to any disclaimer, the term of this patent is extended or adjusted under 35 U.S.C. 154(b) by 22 days.

(21) Appl. No.: 18/582,613

(22) Filed: Feb. 20, 2024

(51) Int. Cl.
| | |
|---|---|
| *A47J 43/28* | (2006.01) |
| *A47G 21/10* | (2006.01) |
| *F21V 33/00* | (2006.01) |
| *G01G 19/56* | (2006.01) |
| *G01K 1/02* | (2021.01) |

(52) U.S. Cl.
CPC ............ *A47G 21/10* (2013.01); *A47J 43/283* (2013.01); *F21V 33/0036* (2013.01); *G01G 19/56* (2013.01); *G01K 1/02* (2013.01); *A47J 2202/00* (2013.01)

(58) Field of Classification Search
CPC .... A47J 43/283; A47J 45/068; A47J 2202/00; A47G 12/10; A47G 2021/008; G01K 1/02; G01K 1/024; G01G 19/56; F21V 33/0036
USPC ............................................. 294/3, 10, 99.2
See application file for complete search history.

(56) References Cited

U.S. PATENT DOCUMENTS

| | | | | |
|---|---|---|---|---|
| 4,580,909 | A * | 4/1986 | McIntosh ............... | A47J 43/283 374/E7.031 |
| 7,409,765 | B2 * | 8/2008 | So .......................... | A47J 45/068 374/155 |
| 10,314,438 | B2 * | 6/2019 | Goldy ....................... | B25F 1/04 |
| 10,448,776 | B2 * | 10/2019 | Johncock ............... | A47J 43/282 |
| 10,620,055 | B2 * | 4/2020 | Keller .................... | G01K 13/00 |
| 2017/0248474 | A1 * | 8/2017 | Nielsen .................. | G01K 1/024 |
| 2021/0267419 | A1 * | 9/2021 | Bradford ............... | A47J 43/288 |

FOREIGN PATENT DOCUMENTS

| | | | |
|---|---|---|---|
| KR | 20230029215 A | * | 3/2023 |
| WO | WO-2017145113 A1 | * | 8/2017 |

* cited by examiner

*Primary Examiner* — Dean J Kramer
(74) *Attorney, Agent, or Firm* — Mooney IP

(57) ABSTRACT

A multifunctional device may include tongs having a first arm and a second arm pivotally connected at a hinge, each arm terminating in a tong end. A multifunctional utensil may include a thermometer comprising a temperature probe and a digital display. A multifunctional utensil may include a thermometer cradle affixed to the device configured to receive the thermometer. A multifunctional utensil may include the thermometer cradle optionally including a retracting mechanism configured to extend and retract the temperature probe through an aperture. A multifunctional utensil may optionally include an integrated digital scale configured for measuring a weight of one or more items held by the tongs.

14 Claims, 8 Drawing Sheets

MULTI-FUNCTIONAL UTENSIL WITH TEMPERATURE SENSING AND DIGITAL INTERACTIVE FEATURES

FIELD OF THE INVENTION

The present disclosure pertains to the field of multi-purpose utensils, particularly to devices integrating handling, temperature sensing, and digital interactive functionalities. More specifically, the disclosure encompasses apparatuses that enhance user experience through the combination of mechanical operation, digital technology for various applications, and software interaction for data management and user guidance.

BACKGROUND

In various domestic and commercial settings, the use of tools and devices for interacting with and processing items is a fundamental aspect of operational efficiency. This includes the facilitation of tasks such as measuring environmental conditions, handling materials, and executing precise actions. Traditional tools designated for these purposes typically focus on singular, isolated tasks without integration of additional functions.

Technological advancements have led to the development of tools enhanced by electronic components aimed at increasing precision and functionality. However, there remains a disconnect between the potential offered by these advancements and the reality of their application in cohesive, multi-functional systems. Users frequently find themselves managing a collection of discrete tools, each with a dedicated but isolated function.

The integration of enhanced data processing and interactivity into conventional tools has seen limited realization in current offerings. The challenge lies in achieving a seamless fusion of functionality that can amalgamate physical manipulation with advancements in technology to offer a more integrated and user-centric toolset.

There is an existing need for an innovative solution that addresses the fragmentation of tool functionalities, providing a unified tool that transforms manual tasks into a streamlined and interactive experience. A system that combines the ability to perform various tasks with a simplified, integrated approach would represent a significant evolution from the segmented nature of conventional tools.

Moreover, the description herein of any disadvantages associated with the described products, methods, and/or apparatus, is not intended to limit the embodiments. Indeed, some aspects may include certain features of the described products, methods, and/or apparatus without suffering from their described disadvantages.

SUMMARY

In some aspects, the techniques described herein relate to a device including: tongs 100 having a first arm 110 and a second arm 120 pivotally connected at a hinge 130, each of the first arm 110 and the second arm 120 terminating in a tong end; a thermometer 150 including a temperature probe 152 and a digital display 154; a thermometer cradle 160 affixed to the device configured to receive the thermometer 150; the thermometer cradle 160 optionally including a retracting mechanism configured to extend and retract the temperature probe 152 through an aperture; and optionally an integrated digital scale 320 configured for measuring a weight of one or more items 410 held by the tongs 100.

In some aspects, the techniques described herein relate to a device, wherein the tongs 100 include a locking mechanism 170 for maintaining a fixed position during use and wherein the thermometer 150 is detachable.

In some aspects, the techniques described herein relate to a device, wherein the tong end 140 of the first arm 110 and/or the second arm 120 includes one or more gripping elements 330 adapted to hold one or more items 410 of various sizes and/or shapes without requiring manual pressure.

In some aspects, the techniques described herein relate to a device, wherein the tongs 100 may be manufactured from a heat-resistant material suitable for use in various temperature conditions and/or may be configured to be disassembled.

In some aspects, the techniques described herein relate to a device, wherein at least one of the first arm 110 or the second arm 120 includes indicia 210 indicating recommended temperatures for one or more items 410 and/or a user-readable code 220. In some aspects, the techniques described herein relate to a device, wherein at least one of the first arm 110 or the second arm 120 includes indicia 210 indicating recommended temperatures for one or more foods being cooked and/or a QR code 220.

In some aspects, the techniques described herein relate to a device, wherein: the cradle 160 is affixed to the device by one or more attachment mechanisms 230; the one or more attachment mechanisms 230 provide a fixedly attached and heat-resistant connection; the one or more attachment mechanisms 230 may be adapted to accommodate varying sizes and shapes of the device; and the one or more attachment mechanisms 230 include: a slotting mechanism, flexible fasteners, clips, staple devices, interlocking components, magnetic attachments, adjustable straps, adjustable bands, suction mechanisms, rail and groove systems, threaded fasteners, hook and loop fasteners, hinged clasps, socket and ball joints, spring clips, dovetail slides, latch systems, adhesives such as heat-resistant glue, epoxies, and bonding agents; or wrapping with thermal resistant tape including an overlay of silicone material.

In some aspects, the techniques described herein relate to a device, wherein the tongs 100 and/or the cradle 160 may be ergonomically designed to accommodate different hand sizes, to facilitate rapid attachment and detachment of the thermometer, and wherein the tongs 100 and/or the cradle 160 include interchangeable hand pieces including material which provides slip resistance and thermal insulation.

In some aspects, the techniques described herein relate to a device, wherein the device is manufactured using various manufacturing techniques including but not limited to additive manufacturing such as 3D printing, injection molding, vacuum casting, and other manufacturing processes suitable for producing the tongs 100 and the cradle 160.

In some aspects, the techniques described herein relate to a device, wherein the integrated digital scale 320 is configured to provide an output indicative of the weight of the one or more items 410 held by the tongs 100, and wherein the integrated digital scale includes a weight sensor positioned on the first arm 110 and/or the second arm 120 and/or the hinge of the tongs 100 to facilitate accurate weight measurement.

In some aspects, the techniques described herein relate to a device, wherein the thermometer 150 is capable of bidirectional wireless communication 340 with an external computing device for sharing data, including but not limited to temperature readings, weight readings, timing information, alerts, messages, or a combination thereof; wherein the thermometer 150 can receive control commands and configuration settings from the external computing device; and wherein the thermometer 150 can transmit data to the external computing device.

In some aspects, the techniques described herein relate to a device, further including a low-light visibility enhancement system, wherein the low-light visibility enhancement system is: a visual indicator 180 for signaling an operational state of the thermometer 150; glow-in-the-dark materials applied to selected portions of the cradle 160 and/or the indicia 210 and/or the user-readable code 220; backlighting for the digital display 154; or a combination thereof.

In some aspects, the techniques described herein relate to a device, further including an integrated light source 350 to provide illumination and/or enhance visibility in low-light conditions.

In some aspects, the techniques described herein relate to a device, wherein the thermometer includes the temperature probe 152 with markings to indicate an appropriate depth of insertion into an item for accurate temperature measurement.

In some aspects, the techniques described herein relate to a device, further including the user-readable code 220 affixed to the tongs 100 and/or the cradle 160, wherein scanning the user-readable code 220 with the external computing device provides access to a digital resource, the digital resource including an application platform with a variety of content such as cooking instructions, safety guidelines, recommended cooking temperatures, recommended cooking times, recipe suggestions, portion information, caloric information and/or facilitating interactive features for personalized content recommendations and community engagement based on user-input criteria.

In some aspects, the techniques described herein relate to a device, wherein the user-readable code 220 when scanned by the external computing device is configured to launch an application on the external computing device to receive weight data from the integrated digital scale and/or temperature data from the thermometer 150 and wherein the application provides an interactive content experience to a user based on the temperature data and/or the weight data received and/or user-input criteria.

In some aspects, the techniques described herein relate to a non-transitory computer-readable medium storing instructions that, when executed by a processor, cause the processor to: connect via wireless protocol with a temperature sensing device accessible on a local area network; provision an application platform accessible by a user, wherein access to the application platform is initiated by scanning a user-readable code 220 affixed to a device including a thermometer 150 and/or an integrated digital scale 320; host the application platform for the user to navigate, register on, and use, including receiving and/or displaying substantially live temperature data from the thermometer and/or substantially live weight data from the integrated digital scale associated with the device; facilitate user input regarding dietary goals and interests, including but not limited to engaging in community forums or obtaining recipe suggestions; conversations related to cooking and dietary goals; provide recipe suggestions and safety guidelines tailored to the substantially live temperature data and/or weight data received, user preferences, and user-input dietary goals; generate cooking instructions, including specified temperatures and/or cooking durations, based on the substantially live temperature data and/or the weight data received, and/or provide temperature probe 152 insertion guidance using visual indicators obtained from a camera of an external computing device; and/or enable user interaction with a variety of content and features based on interests of the user, such as recipe curation, meal-planning assistance, food-related discussions, tracking dietary goals, management of personal profiles to track preferred recipes and/or dietary goals; or a combination thereof.

In some aspects, the techniques described herein relate to a non-transitory computer-readable medium, wherein the application platform further causes the processor to alert users to critical cooking milestones based on the substantially live temperature data received from the thermometer.

In some aspects, the techniques described herein relate to a non-transitory computer-readable medium, wherein the application platform further causes the processor to display detailed heating instructions and/or process suggestions with specific temperature and/or heating time recommendations for one or more items 410, which adjust based on the weight data received and/or type of item being heated. In some aspects, the techniques described herein relate to a non-transitory computer-readable medium, wherein the application platform further causes the processor to display detailed cooking instructions and/or recipe suggestions with specific temperature and/or cooking time recommendations for a variety of foods, which adjust based on the weight data received and/or type of item being cooked.

In some aspects, the techniques described herein relate to a non-transitory computer-readable medium, wherein the application platform further causes the processor to: access and display portion and/or caloric content information for one or more items 410 based on the weight data received from the integrated digital scale; integrate with meal-planning and/or diet-tracking applications to support user dietary goals; and facilitate integration with smart kitchen devices, enabling users to monitor the device directly from the application platform for a connected cooking experience.

In some aspects, the techniques described herein relate to a non-transitory computer-readable medium, wherein the application platform further causes the processor to: provide access to a community forum for culinary enthusiasts to share experiences, information, and/or engage in conversations related to cooking and dietary goals; predict user preferences for future meal planning and shopping list generation based on user interaction with the application platform, historical data, and collected dietary goals; and offer a shopping list generator based on selected recipes and dietary goals.

BRIEF DESCRIPTION OF THE FIGURES

The drawings illustrate generally, by way of example, but not by way of limitation, various aspects discussed in the present document.

DETAILED DESCRIPTION

As used herein, the terms "a" or "an" are used, as is common in patent documents, to include one or more than one independent of any other instances or usages of "at least one" or "one or more."

As used herein, the term "and/or" is meant to be both inclusive and exclusive, such that "A and/or B" includes "A but not B," "B but not A," and "A and B," unless otherwise indicated.

As used herein, the term "about" refers to an amount that is approximately, nearly, almost, or in the vicinity of being equal to or is equal to a stated amount.

References in the specification to "embodiment" or "embodiments", "aspect" or "aspects" indicate that the embodiment or aspect described may include a particular feature, structure, or characteristic, but every embodiment or aspect may not necessarily include the particular feature, structure, or characteristic. Moreover, such phrases are not necessarily referring to the same embodiment or aspect. Further, when a particular feature, structure, or characteristic is described in connection with an aspect, it is submitted that it is within the knowledge of one skilled in the art to affect such feature, structure, or characteristic in connection with other aspects whether or not explicitly described.

Reference will now be made in detail to some aspects of the disclosed subject matter, examples of which are illustrated in the accompanying descriptions and figures. While the disclosed subject matter will be described in conjunction with the enumerated claims, it will be understood that they are not intended to limit the disclosed subject matter to those claims. On the contrary, the disclosed subject matter is intended to cover all alternatives, modifications and equivalents, which may be included within the scope of the presently disclosed subject matter as defined by the claims.

Figure 1:
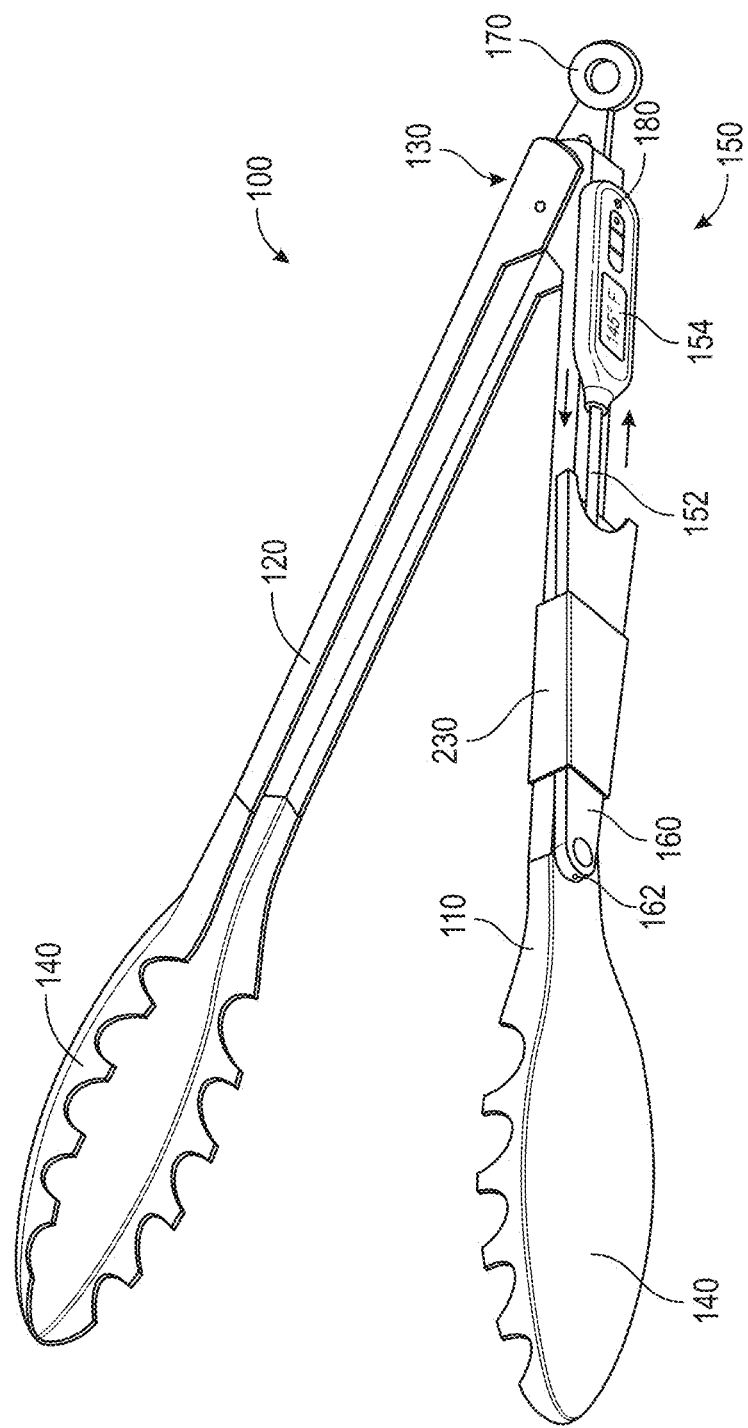
FIG. 1 shows an isometric view of one embodiment of the present disclosure.

Referring now to the drawings, wherein the drawings are for purposes of illustrating some aspects of the present disclosure only, and not for purposes of limiting the same and wherein like reference numerals designate identical or corresponding parts throughout the several views, and referring particularly to FIG. 1, an exemplary multipurpose device for manipulating and interacting with items is depicted.

FIG. 1 provides an isometric view of the present disclosure which relates to a multi-purpose utensil designed with a range of functionalities to aid in diverse operational applications.

In various embodiments, the device of the present disclosure may include tongs 100 with a first arm 110 and a second arm 120. In some embodiments the first arm 110 and the second arm 120 may extend from a proximal end, which may be oriented towards a user during use, to a distal end which may be configured to contact and/or manipulate items. In various aspects the proximal end may include a hinge 130 and/or a locking mechanism 170. In various embodiments the distal end may include tong ends 140. In some aspects the tong ends 140 may include one or more gripping elements 330 adapted to hold one or more items 410 of various sizes and/or shapes. In some embodiments the tong ends 140 may include one or more gripping elements 330 adapted to hold one or more items 410 of various sizes and/or shapes without requiring manual pressure.

In various embodiments the first arm 110 and the second arm 120 may be pivotally connected at a hinge 130. In certain embodiments the first arm 110 and the second arm 120 may be pivotally connected at a hinge 130 to enable relative movement between the first arm 110 and the second arm 120. In various aspects the tongs 100 may terminate in tong ends 140. In various aspects at least one of the first arm 110 or the second arm 120 may terminate in tong ends 140. In various aspects the tongs 100 may include a detachable thermometer 150. In some aspects the detachable thermometer 150 may include a temperature probe 152. In some aspects the detachable thermometer 150 may include a digital display 154. In some aspects the tongs 100 may include an integrated thermometer cradle 160. In some aspects the thermometer cradle 160 may be configured to receive the temperature probe 152 of the detachable thermometer 150. In some aspects the tongs 100 may include a locking mechanism 170. In some aspects the detachable thermometer 150 and/or the thermometer cradle 160 and/or the tongs 100 may include a retracting mechanism 310 configured to extend and retract the temperature probe 152. In certain aspects the temperature probe 152 may be extended and retracted through an aperture. In several aspects the aperture may be located in the thermometer cradle 160. In other aspects, the aperture may be integrated in the tongs 100.

In various embodiments the diverse operational applications may include diverse heating and preparation tasks. In various embodiments the diverse heating and preparation tasks may include the manipulation of substances in kitchen or laboratory settings. In one embodiment, the multi-functional device may be a cooking device. In various aspects the multi-functional device may be tongs 100 for use in a laboratory. In some embodiments the tongs 100 may be used for handling chemicals, samples, and/or hot glassware. In various aspects the multi-functional device may be tongs 100 for use in a medical setting. In various aspects the 100 may be used in medical and/or surgical environments. In several embodiments the tongs 100 may be used for handling sterile items and/or biological samples. In some embodiments the multi-functional device may be tongs 100 for use in industrial settings. In various aspects the tongs 100 may be used in manufacturing and/or mechanical environments to handle hot, cold, hazardous materials and/or combinations thereof. In some aspects the tongs 100 design may include features including but not limited to enhanced grip strength and/or resistance to extreme temperatures and/or resistance to corrosive materials. In some embodiments the multi-functional device may be tongs 100 for use in gardening and/or agricultural settings. In several embodiments the tongs 100 may be adapted for gardeners to handle plants, particularly cacti or other prickly plants. In some embodiments the multi-functional device may be tongs 100 for use in aquaria and/or aquatic settings. In several aspects the tongs 100 may be adapted for aquarium maintenance. In several embodiments the tongs 100 may be adapted for moving live rocks, plants, handling delicate marine life and/or combinations thereof.

In some embodiments the multi-functional device may be tongs 100 for use in barbeque settings. In several aspects the tongs 100 may be adapted for outdoor grilling. In certain aspects the tongs 100 may be constructed from rugged and/or heat-resistant features for handling different types of grilled foods and charcoals. In some embodiments the multi-functional device may be tongs 100 for use in arts and/or crafts settings. In several aspects the tongs 100 may be used for artists and crafters to handle hot materials such as wax, metals such as for jewelry making, ceramics and/or combinations thereof.

In various aspects the multi-functional device may be tongs 100 for use in culinary science. In some embodiments the tongs 100 may be utilized for tasks requiring temperature measurements in food preparation. In some embodiments the multi-functional device may be tongs 100 for use in baking and pastry environments. In certain aspects the tongs 100 may be employed for handling pastries or baked goods, with the thermometer providing temperature data relevant to baking processes. In certain aspects the tongs 100 may be used for tasks requiring precise temperature control, such as chocolate tempering or sugar work. In various aspects the multi-functional device may be tongs 100 for outdoor or camping use. In several aspects the tongs 100 may be designed for handling materials in outdoor cooking scenarios, including logs or coals. In some aspects the tongs 100 may be employed for cooking over an open flame. In various aspects the thermometer 150 may be used for gauging cooking temperatures and/or environmental conditions.

In some embodiments the multi-functional device may be tongs 100 for use in educational settings. In several embodiments the tongs 100 may be employed in school science laboratories for demonstrations involving temperature measurement. In some embodiments the multi-functional device may be tongs 100 for use in photography darkrooms. In several aspects the tongs 100 may be adapted for handling chemicals and photographic papers safely.

In various aspects the multi-functional device may be tongs 100 for automotive use. In certain aspects the tongs 100 may be used by mechanics for handling hot and/or oily engine parts, with the thermometer aiding in temperature assessment of engine components. In some embodiments the multi-functional device may be tongs 100 for blacksmithing applications. In several embodiments the tongs 100 may be utilized for handling hot metals, with the thermometer assisting in monitoring metal temperature during forging. In various aspects the multi-functional device may be tongs 100 for glassblowing activities or sculpting. In certain aspects the tongs 100 may be employed for handling hot glass, with the detachable thermometer 150 used to monitor temperatures critical to glassblowing processes. In some aspects the tongs 100 may assist in shaping and/or cooling glass artworks. In various embodiments the detachable thermometer 150 may be used in providing artwork temperature measurements In some embodiments the multi-functional device may be tongs 100 for use in electronics manufacturing or repair. In several aspects the tongs 100 may be suitable for handling sensitive electronic or other components. In various aspects the detachable thermometer 150 may be used in monitoring temperatures to prevent overheating during soldering or similar processes. In some embodiments, the multi-functional device may be tongs 100 used for information technology applications. In various aspects the tongs 100 may be used in data centers. In several aspects the tongs 100 may be used for managing hot server equipment. In several embodiments the tongs 100 and the detachable thermometer 150 may be used in ensuring components stay within safe operating temperatures.

In various aspects the multi-functional device may be tongs 100 for cleaning or janitorial applications. In certain embodiments the tongs 100 may be employed for sanitary handling of items, including potentially hazardous materials.

In some embodiments the multi-functional device may be tongs 100 for ice sculpture creation. In several aspects the tongs 100 may be adapted for handling large blocks of ice, with the thermometer aiding in temperature monitoring to prevent cracking of the ice.

In various aspects the multi-functional device may be tongs 100 for aquaponic system management. In some embodiments the tongs 100 may be used for managing plants and/or fish in aquaponic systems. In various embodiments the detachable thermometer 150 may be used in monitoring water and/or system temperatures. In some embodiments the multi-functional device may be tongs 100 for use in craft brewing. In certain aspects the tongs 100 may be employed for handling hot brewing equipment or ingredients. In some embodiments the detachable thermometer 150 may be used in temperature control during brewing processes.

In various embodiments the detachable thermometer 150 may be used in ensuring safe handling. In many aspects, the multi-functional device may be tongs 100 used for beekeeping applications. In some embodiments the tongs 100 may be utilized for handling hive frames or components. In various embodiments the thermometer 150 may be used in maintaining a suitable environment for bees.

In other embodiments, the multi-functional device may be tongs 100 for use in forensic science applications. In certain aspects the tongs 100 may be employed for collecting evidence. In various embodiments the detachable thermometer 150 may be used in maintaining and/or recording the temperature of the sample. In various aspects, the multi-functional device may be tongs 100 used for craft beverage making. In various embodiments the tongs 100 may be used for home brewing and/or wine making. In several embodiments the thermometer detachable thermometer 150 may be used in monitoring fermentation processes. In various aspects the tongs 100 may be used for handling equipment or ingredients.

In certain aspects, the multi-functional device may be tongs 100 for wildlife research and handling. In various aspects the tongs 100 may allow for the examination of animals and/or habitats with minimal disturbance. In various embodiments the detachable thermometer 150 may be used for logging environmental data related to temperature.

In various embodiments the functionalities may include manipulation tasks. In another embodiment, the manipulation tasks may be manipulating and/or gripping one or more items 410. In some embodiments the one or more items 410 may include food. In various embodiments, the multi-purpose tool may be used for holding food before, during and/or after the cooking process.

The described multi-functional cooking device may present a range of configurations and material compositions, which aim to support diverse heating and preparation tasks beyond handling food. In various embodiments the diverse heating and preparation tasks may include the manipulation of non-edible substances in kitchen or laboratory settings.

In various aspects the tongs 100 may include a first arm 110 and a second arm 120. In some embodiments the first arm 110 and the second arm 120 may extend from a proximal end, which may be oriented towards a user during use, to a distal end which may be configured to contact and/or manipulate items. In various aspects the proximal end may include the hinge 130 and/or the locking mechanism 170. In various embodiments the distal end may include the tong ends 140. In certain aspects the first arm 110 and the second arm 120 may include contact surfaces that may be configured to enhance grip on one or more items 410.

In several embodiments, the first arm 110 and the second arm 120 of the tongs 100 may be configured in a multitude of shapes to accommodate various functionalities and aesthetic preferences. In certain aspects, the first arm 110 and/or the second arm 120 may be of a solid construction. In other embodiments, the first arm 110 and/or the second arm 120 may embody a C-shaped profile. In various embodiments, a C-shaped profile may reduce material usage while maintaining structural integrity. In various embodiments, the first arm 110 and/or the second arm 120 may include a design incorporating apertures and/or holes. In some embodiments, the first arm 110 and/or the second arm 120 may include a textured or waffle-like surface design.

In certain embodiments, the tongs 100 and/or the cradle 160 may be fabricated employing additive manufacturing methods, such as 3D printing. In some embodiments the tongs 100 and/or the thermometer cradle 160 may be fabricated using various manufacturing techniques including but not limited to injection molding, vacuum casting, die-casting, forging, computer numerical control (CNC) machining or a combination thereof.

In some embodiments, the tongs 100 may be composed of materials suitable for culinary use. In several aspects the tongs 100 may be composed of food-grade stainless steel, heat-resistant plastics or combinations thereof. In several aspects, the materials selected for the tongs may ensure durability and resistance to heat and corrosion. In some aspects, the tongs may be constructed from heat-resistant materials. In some aspects the first arm 110 and/or the second arm 120 may be constructed from heat-resistant materials. In certain aspects the tongs 100, the first arm 110, the second arm 120 and the tong ends 140 may be constructed from heat-resistant materials. In certain aspects the tongs 100 may safely be used in environments subject to various temperature conditions, such as stovetops, ovens, or open flame scenarios. In various embodiments the tongs 100 may be constructed from stainless steel, silicone, carbon fiber, titanium, aluminum, high-temperature plastics, ceramics, nylon, glass-fiber reinforced plastics, wood, bamboo, brass, bronze, rubber-coated metals, composite materials, Kevlar® or other aramid fibers, or a combination thereof. In various aspects the high-temperature plastics may include polyetheretherketone (PEEK), polytetrafluoroethylene (PTFE), polybenzimidazole (PBI), polyetherimide (PEI), polysulfone (PSU), polyphenylene sulfide (PPS), polyimide (PI), polyamide-imide (PAI), polyphenylsulfone (PPSU), polyaryletherketone (PAEK), polyetherketoneketone (PEKK), polyarylsulfone (PAS), polyethylene naphthalate (PEN), polyvinyldifluoride (PVDF), fluorinated ethylene propylene (FEP) or a combination thereof.

In various embodiments the first arm 110 and the second arm 120 of the tongs 100 may be constructed from materials selected for their slip-resistant properties. These materials may include, but are not limited to, silicone, rubber, carbon fiber reinforced polymer (CFRP), glass fiber reinforced polymer (GFRP), aramid fiber reinforced polymer (AFRP), polyphenylene sulfide (PPS) composites, polyetheretherketone (PEEK) composites, silicone rubber composites, epoxy resin composites, and phenolic resin composites, or a combination thereof. In some embodiments the materials may allow for a firm non-slip grip maintained by the user, thereby reducing the likelihood of accidental release and/or slippage during use.

In various aspects the non-slip grips and balanced weight distribution incorporated into the design of tongs 100 may provide user comfort. The ergonomic design may include contoured arm surfaces and materials that enhance grip, adjustable to fit various hand sizes and/or grip strengths. In several embodiments this adjustable design may improve ease of operation. In some embodiments materials known for their vibration damping properties, such as certain elastomers or specialized foam composites, may be included to reduce fatigue during prolonged use. In some aspects, the handle design may include ergonomic contours that align with the natural curvature of the user's hands, further enhancing grip and comfort.

In some embodiments, the gripping material on the first arm 110 and the second arm 120 may be fabricated from thermally insulative materials such as silicone, thermoplastic elastomers, or other high thermal resistance materials. In some embodiments, the thermally insulative material may prevent the conduction of heat from the tong ends 140 to the user's hands. In various embodiments the insulative material may provide a safer gripping surface when handling one or more items 410.

In many aspects, the first arm 110 and/or the second arm 120 may include ergonomic features to enhance user comfort and grip stability during use. In various embodiments the ergonomic feature may include a comfort grip which may be integrated into the surface of the first arm 110 and/or the second arm 120. In various aspects the comfort grip may include one or more textures and/or one or more contours that conform to the natural curvature of a user's fingers, optimizing contact and reducing hand fatigue.

In certain embodiments, the comfort grip may be composed of materials such as silicone, rubber, silicone composites, thermoplastic elastomer (TPE) composites, fluoropolymer composites, polyimide composites, polyamide-imide composites, polysulfone composites, polyetherimide composites, polybenzimidazole (PBI) composites, or a combination thereof. In some aspects these materials may ensure a secure grip by conforming to the pressure exerted by a user's hand. In certain aspects these materials may resist oils and/or other cooking fluids that may compromise grip security.

In some embodiments, the 110 and/or the second arm 120 and/or the thermometer cradle 160 may include interchangeable hand pieces. In some aspects the interchangeable hand pieces may be configured to easily attach and/or detach. In some embodiments, the interchangeable hand pieces may allow users to customize the grip according to their preference or task requirements. In some aspects the material used for the interchangeable hand pieces may include slip-resistant textures to enhance grip stability and thermally insulative materials to protect the user's hands from heat.

In various embodiments the thermometer cradle 160 may incorporate an ergonomic feature designed to withstand high temperatures while enhancing user comfort. In certain embodiments, the thermometer cradle 160 may include an optional ergonomic feature that may be either securely or removably affixed to the cradle 160. In various aspects, the ergonomic feature may be constructed of materials such as silicone, thermoplastic elastomers (TPEs), stainless steel, aluminum, heat-resistant nylon, glass-filled nylon, carbon fiber composites, silicone gel, thermally stable polymeric gels, heat-resistant hydrogels or a combination thereof. In various embodiments the ergonomic feature may include an indentation and/or a contour to accommodate the thumb or finger of a user. In various aspects the indentation and/or contour may provide enhanced comfort and/or grip stability during the operation of the tongs 100. In some embodiments, the ergonomic feature may be tailored to conform to the natural curvature of the user's hand. In some aspects the ergonomic feature may reduce strain and improve ergonomic efficiency.

In various aspects the tongs 100 include a hinge 130. In some embodiments the hinge 130 may allow the first arm 110 and the second arm 120 to move from an open position to a closed position. In some embodiments the open position may allow the tong ends 140 to be spaced apart. In several aspects the tong ends 140 of the tongs 100 may grasp and/or manipulate one or more items 410. In some embodiments the closed position may allow the tongs 100 to be placed in storage. In certain embodiments the closed position may allow the tongs 100 to securely hold one or more items 410. In some embodiments, the tong ends 140 may assist in grasping and manipulating food items.

In certain embodiments, the hinge 130 of the tongs 100 may be a pivotal connection point between the first arm 110 and the second arm 120. In certain embodiments the hinge 130 of the tongs 100 may allow for the movement and articulation necessary to grasp and release one or more items 410. In some embodiments, the hinge 130 may be integrated with a spring mechanism. In certain embodiments the spring mechanism may bias the first arm 110 and the second arm 120 into an open position. In some embodiments the open position bias may assist with one-handed operation. In certain embodiments the open position bias may reduce user fatigue.

In various aspects, the design of the hinge 130 may include a pin, a bolt, or another form of fastener known to a person of ordinary skill in the art. In certain embodiments the hinge 130 may secure the arms together while allowing relative rotational movement. In several embodiments, the materials used for the hinge 130 may be selected for their strength, resistance to wear, compatibility with the temperature variations or a combination thereof.

In various embodiments, the materials and construction of the hinge 130 may be chosen to allow it to withstand repeated use. In some embodiments the materials may provide resistance to wear, deformation, and/or user fatigue. In several aspects, the design of the hinge 130 may ensure that the hinge 130 does not loosen or become misaligned over time. In certain embodiments the design of the hinge 130 may preserve the functional integrity and/or performance of the tongs 100 throughout their intended lifespan. In some embodiments the design and/or material choices for the hinge 130 may result in a hinge 130 and/or tongs 100 which withstand repeated use, cleaning, exposure to various temperatures, exposure to various substances or a combination thereof.

In certain embodiments the hinge 130 may be constructed from materials including but not limited to stainless steel, carbon steel, aluminum, brass, bronze, titanium, polypropylene, nylon, PEEK (polyether ether ketone), high-performance thermoplastic polymers, polyamide-imide (PAI) such as Torlon®, silicone, ceramics, composites, biodegradable materials, glass-filled materials, metal alloys, thermoplastic elastomers, rubber, durable polymers, reinforced composites or a combination thereof.

In some embodiments, the hinge 130 may include features that may assist in the alignment and stability of the arms during use. In other aspects, the hinge 130 may be designed to minimize food particle accumulation. In certain embodiments the hinge design may facilitate cleaning and/or may contribute to maintaining sanitary conditions. In many embodiments, the hinge 130 may be constructed to withstand repeated use while maintaining its functional integrity over the lifespan of the tongs 100.

In certain embodiments, the hinge 130 may be designed with smooth surfaces and minimal crevices to minimize food particle accumulation. In several embodiments the hinge 130 design may assist in preventing or reducing food debris from becoming lodged in the hinge. In various embodiments the hinge 130 design may facilitate cleaning. In some aspects, these design features of the hinge 130 may contribute to maintaining sanitary conditions by reducing the potential for bacterial growth in hard-to-clean areas.

In certain embodiments, the tongs 100 may include a detachable mechanism which may allow the first arm 110 and second arm 120 to be disengaged from one another. In various aspects the detachable mechanism may include pins, hinges, clips, or a combination thereof which may be manipulated to release the arms from their locked state. In certain aspects the detachable mechanism may provide a method for disassembling the 100. In some aspects the tongs 100 may be configured to be disassembled for ease of cleaning or storage. In certain embodiments, disassembling the tongs may allow for compact storage. In certain aspects the first arm 110 may be separated from the second arm 120 which may reduce the storage footprint of the tongs 100.

In certain embodiments, the tongs 100 may be structured without a hinge 130. In various aspects the first arm 110 and second arm 120 of the tongs 100 may be connected at one end by a resilient material or mechanism which naturally biases the arms towards a default closed or open position. In certain embodiments, the first arm 110 and second arm 120 may be formed from a single piece of resilient material, such as a metal and/or durable plastic, which is curved in such a way that the inherent tension or springiness of the material maintains the operational relationship between the two arms. In certain aspects the resilient material may be a spring steel, a metal alloy with memory properties, a flexible polymer, or a combination thereof that allows the arms to return to their resting position after being squeezed together. In various aspects, the flexible polymers may include, but are not limited to, silicone-based materials, fluoropolymers like polytetrafluoroethylene (PTFE), high-temperature plastics such as polyetheretherketone (PEEK) or a combination thereof.

In certain embodiments the tongs 100 may include a locking mechanism 170. In various aspects the locking mechanism 170 positioned on the tongs 100 may be configured to maintain a fixed position during use. In some embodiments the locking mechanism 170 may be positioned near the pivot point of the first arm 110 and the second arm 120. In various aspects the locking mechanism 170 may be positioned near the hinge 130 of the tongs 100. In certain embodiments the locking mechanism 170 may be activated to maintain the tongs 100 in a fixed operational position. In various embodiments the locking mechanism 170 may include but is not limited to a sliding bar, a push-button system, or any other suitable configuration that enables the user to secure the tongs 100 in a desired position.

In certain embodiments, the locking mechanism 170 of the tongs 100 may include a pull-to-lock feature, which may consist of a metal and/or plastic loop attached to one of the first arm 110 or the second arm 120 that may be pulled upwards to engage with a corresponding catch and/or slot on the other first arm 110 or the second arm 120. In some embodiments, the locking mechanism 170 may include a sliding ring mechanism that may move along the arms to keep the tongs in a closed position for storage. In various embodiments, the locking mechanism 170 may be a push-button system integrated into the handles. In various aspects the push-button system may engage a locking catch when pressed. In several embodiments, the locking mechanism 170 may include a magnetic component. In various aspects the magnetic component may include magnets embedded in the first arm 110 and/or the second arm 120. In certain embodiments the magnetic component may hold the tongs closed when not in use. In other embodiments, a latch and/or clasp may be used as the locking mechanism 170. In various aspects the latch and/or clasp may snap into place to secure the closed position of the tongs. In many embodiments, an interlocking gear and ratchet system may be used as the locking mechanism 170. In various embodiments the interlocking gear and ratchet system may allow for adjustable locking positions. In some embodiments the locking mechanism 170 may be constructed from materials such as stainless steel, aluminum, plastic, silicone, nylon, brass, titanium, composites or a combination thereof. In some aspects, the locking mechanism 170 may be designed with an easy-release mechanism. In various embodiments the easy-release mechanism may allow the user to unlock the tongs with a single hand movement and/or a single finger movement. In various embodiments the easy-release mechanism may allow the user to unlock the tongs with a two hand movement. In some embodiments the single handed unlocking of the locking mechanism 170 may involve the user squeezing the arms of the tongs together. In certain embodiments the user squeezing the arms of the tongs together may disengage the locking mechanism due to the action of an integrated spring mechanism. In various embodiments, the locking mechanism 170 may be disengaged by a single finger movement, where the user may press a button or lever located in an optimal position for thumb or finger access. This action may release the lock without requiring the user to adjust their grip or use their second hand, which may provide convenience during cooking activities. In certain embodiments, the locking mechanism 170 may be detachable and/or retractable to avoid obstruction during operation of the tongs 100. In various aspects, the locking mechanism 170 may integrate an automatic lock-release when the tongs are squeezed. In several aspects, the locking mechanism 170 may be positioned in a manner that may avoid unintended engagement or disengagement during the use of the tongs. In other aspects, the locking mechanism 170 materials and design may be chosen for their ability to withstand high temperatures, exposure to food acids, and/or repeated cycles of dishwasher cleaning without degrading.

In some embodiments the tongs 100 may include integration points for additional components. In several embodiments the integration points may enhance the functionality of the tongs 100. In certain embodiments the integration points may include preexisting holes situated along the arms of the tongs. In several embodiments the preexisting holes situated along the arms of the tongs may serve as anchor points for modular attachments including but not limited to spatula plates, fork inserts, sensor modules or a combination thereof. In certain aspects sensor modules may monitor cooking temperature. In various embodiments the first arm 110 and/or the second arm 120 may include potential slot integration for additional attachments. In various embodiments the slot integration may be adapted to receive various kitchen tool end pieces, such as mixing whisks and/or blade attachments for cutting.

In various embodiments the tongs 100 may include a first arm 110 and a second arm 120, where one or more of the first arm 110 and/or the second arm 120 may terminate in tong ends 140. In some embodiments the tong ends 140 may be adapted for the manipulation of one or more items 410. In several embodiments the tong ends 140 may be configured to facilitate engagement with items in specialized settings, including art studios, scientific laboratories, and workshops. In various embodiments, the tong ends 140 may be equipped with features such as serrations and/or ridges and/or silicone grips to facilitate the manipulation of items under a variety of conditions. In several embodiments, the tong ends 140 may include gripping elements 330 to improve the handling and/or control of items. In various aspects the tong ends 140 may include one or more gripping elements 330 adapted to hold one or more items 410 of various sizes and/or shapes without requiring manual pressure.

In certain embodiments, the tong ends 140 may be constructed with flat, paddle-like shapes that may engage a wide surface area of one or more items 410. In some embodiments, the tong ends 140 may be curved. In various embodiments the tong ends 140 may be forked. In various aspects the shape of the tong ends 140 may assist in the handling of various types of food. In some embodiments the shape of the tong ends 140 may assist in gripping round objects. In some embodiments the shape of the tong ends 140 may assist in securing one or more items 410 that may benefit from a contoured surface. In various embodiments, the tong ends 140 may be pointed to aid in picking up small or delicate items. In several embodiments, the tong ends 140 may include scalloped edges. In several embodiments, the tong ends 140 may include serrated edges. In several embodiments, the tong ends 140 may include edges that may grasp items with irregular surfaces. In other embodiments, the tong ends 140 may have a combination of flat and serrated areas to provide versatility in use. In several embodiments, the tong ends 140 may be shaped to correspond with specific types of foods encountered in preparation and serving. In various embodiments the tong ends 140 may include a variety of shapes, including but not limited to flat, curved, forked, pointed, scalloped, serrated, or a combination thereof. In certain embodiments the description of the tong ends 140 may characterize the physical attributes of the tong ends 140 without assigning functionality.

In certain embodiments, the tong ends 140 may be configured to withstand specific temperature thresholds associated with cooking environments. The design of the tong ends 140 may focus on maintaining shape and mechanical properties despite thermal exposure. In some embodiments the tong ends 140 may be configured to withstand temperatures from below 0° C. to about 1650° C., below 0° C. to approximately about 20° C., about 20° C. to about 300° C., about 20° C. to about 100° C., about 100° C. to about 400° C., about 400° C. to about 600° C., about 600° C. to about 800° C., about 800° C. to about 1000° C., about 1000° C. to about 1200° C., about 1200° C. to about 1400° C., about 1400° C. to about 1600° C., greater than about 1600° C., about 20° C. to about 600° C., about 80° C. to about 200° C., about 50° C. to about 1000° C.

In some embodiments, the structural integrity of the tong ends 140 may be preserved through various cycles of usage and cleaning by selection of appropriate design parameters. In various embodiments, the tong ends 140 may exhibit flexibility to accommodate different sizes of food items, with the capability to revert to their initial shape post-flexing, a property inherent to the materials used in construction. In several embodiments, the surface of the tong ends 140 may possess resistance to staining from food and cleaning agents due to the material characteristics. In other embodiments, the tong ends 140 may be compatible with dishwasher cleaning processes, implying a resistance to degradation under the conditions within a dishwasher environment. In many embodiments, the material composition of the tong ends 140 may prevent chemical interaction with food items to avoid altering the taste or safety of the food. In certain aspects, the tong ends 140 may be available in various surface finishes or colors, attributes that may be determined by the manufacturing process without affecting the tong's utility. In some aspects, features facilitating storage, such as collapsible forms or integrated hanging loops, may be part of the tong ends 140 design, optimizing for space efficiency and storage convenience.

In several embodiments, the tong ends 140 may incorporate teeth or serrations that may engage with each other to facilitate the gripping of items. These teeth may be designed to interlock at various depths and intervals, which may allow the tongs to hold onto items with irregular surfaces or that require a firmer grip.

In certain embodiments, the tongs 100 may be configured to include a thermometer cradle 160. In various embodiments the thermometer cradle 160 may be fixedly attached to the tongs 100. In some embodiments the thermometer cradle 160 may be fixedly attached to the tongs 100 using one or more attachment mechanisms 230. In certain embodiments the one or more attachment mechanisms 230 may provide a secure yet detachable connection of a thermometer cradle 160 to the tongs 100. In several embodiments the thermometer cradle 160 may accommodate a detachable thermometer 150. In various embodiments the detachable thermometer 150 may be integrated into the tongs 100. In various aspects the detachable thermometer 150 may include a temperature probe 152. In various aspects the detachable thermometer 150 may include a digital display 154. In various aspects the detachable thermometer 150 may include a retracting mechanism. In several embodiments the temperature probe 152 may be configured to measure the temperature of one or more items 410 when the tong ends 140 of the tongs 100 are in use. In various aspects the thermometer 150 may be securely attached to the tongs 100 without interfering with the primary utility of the tongs 100.

In various embodiments, the one or more attachment mechanisms 230 may be adaptable to accommodate a wide range of shapes and/or sizes of tongs 100 and thermometer cradles 160. In other embodiments, the thermometer cradle 160 may be designed to ergonomically fit the user. In some aspects the thermometer cradle 160 may accommodate various shapes and/or sizes of detachable thermometers 150.

In several embodiments, the structure of the tongs may facilitate the attachment and detachment of the thermometer cradle 160 through a mating mechanism integrated within the arms. In other embodiments, the detachable thermometer 150 may be secured to the thermometer cradle 160 which may be secured to the tongs 100 while the tongs 100 are in use. In various aspects, the detachable thermometer 150 may be removed from the thermometer cradle 160 for independent use and/or for ease of cleaning. In various aspects, the detachable thermometer 150 may be designed to operate independently of the tongs 100 when detached.

In some aspects, the detachable thermometer 150 may allow direct temperature readings of food including meat or vegetables or vegetarian protein. In some aspects, the detachable thermometer 150 may allow direct temperature readings of cooking and/or heating surfaces including but not limited to grill racks. In In some aspects, the detachable thermometer 150 may include a spring-loaded mechanism. In some aspects, the detachable thermometer 150 may include depth markings for correct insertion. In some aspects, the detachable thermometer 150 may include visual aids such as depth rings located on the temperature probe 152. In some aspects, the depth rings may be laser etched into the temperature probe 152. In some aspects, the depth rings may be implemented using any technique known in the art.

In some aspects, the detachable thermometer 150 may include an integrated digital scale 320 within the tongs and/or the detachable thermometer 150. In some aspects, the integrated digital scale 320 may allow a user 810 to weigh meat cuts or other foods. In some aspects, the integrated digital scale 320 may provide digital output. In some aspects, the detachable thermometer 150 may include features such as glow-in-the-dark and/or backlight for low-light visibility, and flexible attachments adapting to different tong sizes.

In certain embodiments, the thermometer cradle 160 may be attached to the tongs 100 utilizing a variety of one or more attachment mechanisms 230. In some aspects, these attachment mechanisms 230 may include but are not limited to adhesive bonds, mechanical fasteners, snap-fit connections, magnetic couplings hook and loop fasteners, or a combination thereof.

In several embodiments, the thermometer cradle 160 may incorporate a shrink wrap attachment as one of the one or more attachment mechanisms 230. In certain embodiments, a heat-shrinkable material may envelop both the thermometer cradle 160 and a portion of the tongs 100, thereby creating a fixed position for the cradle 160 upon the application of heat.

In various embodiments the heat-shrinkable material used to secure the thermometer cradle 160 to the first arm 110 and/or the second arm 120 of the tongs 100 may include but is not limited to polyethylene, polyolefin, fluoropolymer, polyvinyl chloride, polytetrafluoroethylene, polypropylene, ethylene-vinyl acetate, neoprene, silicone elastomer, polyamide, polyether block amide, polyurethane, polyester, thermoplastic elastomer, thermoplastic rubber, styrene-butadiene copolymers or a combination thereof.

In various embodiments, the one or more attachment mechanisms 230 may include clips for affixing the thermometer cradle 160 to the tongs 100. In various embodiments the clips may be designed to clasp around the first arm 110 and/or the second arm 120 of the tongs 100.

In various embodiments the clips used to secure the thermometer cradle 160 to the first arm 110 and/or the second arm 120 of the tongs 100 may include but is not limited to stainless steel, aluminum, brass, copper, titanium, nickel, thermoplastic polymers, acrylonitrile butadiene styrene (ABS), polylactic acid (PLA), polyethylene terephthalate glycol (PETG), polycarbonate, polyamide (Nylon), polypropylene, thermoplastic polyurethane (TPU), polyether ether ketone (PEEK), polyetherimide (ULTEM), metal-infused filaments, wood composites, carbon fiber composites, glass-filled nylon, conductive materials, magnetic materials, photopolymer resins, ceramic materials, biodegradable materials, silicone, rubber, epoxy, or a combination thereof.

In various embodiments the clips used to secure the thermometer cradle 160 to the first arm 110 and/or the second arm 120 of the tongs 100 may be manufactured using for example, injection molding, metal stamping, die casting, machining, extrusion, metal forging, metal fabrication, laser cutting, water jet cutting, CNC routing, thermoforming, powder metallurgy, metal injection molding, wire forming, sheet metal bending, lost-wax casting, sand casting, investment casting, rotary molding, blow molding, or a combination thereof.

In some embodiments the one or more attachment mechanisms 230 may include a sliding track mechanism. In certain embodiments the sliding track mechanism may allow the thermometer cradle 160 to be repositioned or removed from the tongs 100. In various embodiments the sliding track mechanism may include a rail or groove on the tongs 100, into which the thermometer cradle 160 may be inserted and subsequently slid into a locked position.

In various aspects, the sliding track mechanism may allow for longitudinal movement of the thermometer cradle 160 along the tongs 100, enabling the cradle 160 to be adjusted to different positions or detached completely. In several embodiments, the sliding track mechanism may consist of a male-female coupling system where the thermometer cradle 160 may possess a protruding element that may slide within a corresponding track on the tongs 100.

In other embodiments, a release mechanism may be incorporated into the sliding track mechanism, which may permit the thermometer cradle 160 to be released from the track without the need for additional tools. In some aspects, this release mechanism may be activated by a simple manual action, such as a press, slide, squeeze, or a combination thereof to disengage the cradle 160 from the tongs 100.

In many embodiments, the sliding track mechanism may be designed to provide a secure fit for the thermometer cradle 160. In various embodiments the sliding track mechanism may reduce the likelihood of inadvertent detachment during the use of the tongs 100. In various aspects, the sliding track mechanism may be fabricated from materials that may endure the environmental conditions typically encountered during the operation of the tongs 100.

In various embodiments the sliding track mechanism may be fabricated from materials which include but are not limited to aluminum, stainless steel, brass, bronze, copper, zinc, titanium, carbon steel, polycarbonate, ABS (acrylonitrile butadiene styrene), POM (polyoxymethylene), Nylon (polyamide), HDPE (high-density polyethylene), PVC (polyvinyl chloride), PEEK (polyether ether ketone), acrylic, fiberglass, composites, Delrin (acetal homopolymer), PET (polyethylene terephthalate), PTFE (polytetrafluoroethylene), UHMWPE (ultra-high molecular weight polyethylene) or a combination thereof.

In some embodiments the one or more attachment mechanisms 230 may include hook and loop fasteners. In certain embodiments the hook and loop fasteners may allow the thermometer cradle 160 to be repositioned and/or removed from the tongs 100.

In certain embodiments, the one or more attachment mechanisms 230 may include staple devices. In some aspects the staple devices may be U-shaped fasteners made of metal or a durable plastic. In some aspects the staple devices may be clinched manually and/or mechanically. In other aspects, the one or more attachment mechanisms 230 may be other shapes as would be readily envisaged by a person of ordinary skill in the art.

In some embodiments, the one or more attachment mechanisms 230 may include interlocking components. In various aspects, the thermometer cradle 160 may be configured to include a protruding tab which snaps into a corresponding slot on the tongs 100. In other embodiments, the protruding tab may be located on the tongs 100 and the corresponding slot may be located on the thermometer cradle 160.

In various aspects the one or more attachment mechanisms 230 may include adjustable straps and/or adjustable bands, which may accommodate varying sizes and/or shapes of the tongs 100 and/or the thermometer cradle 160. In various aspects the adjustable straps and/or adjustable bands may allow for a custom fit for differently sized detachable thermometers 150 and/or differently sized thermometer cradles 160. In various aspects suction mechanisms may be used to affix the thermometer cradle 160 to the tongs 100.

In various aspects the one or more attachment mechanisms 230 may include threaded fasteners. In some aspects the threaded fasteners may provide an adjustable connection. In other aspects the one or more attachment mechanisms 230 may include hinged clasps, socket and ball joints, spring clips, dovetail slides, latch systems or a combination thereof.

In certain embodiments, the one or more attachment mechanisms 230 may include adhesives such as heat-resistant glue, epoxies, bonding agents or a combination thereof. In various aspects, the adhesives may include but are not limited to high-temperature epoxy resin, silicone-based adhesives, polyimide adhesives, phenolic resin adhesives, high-temperature cyanoacrylate adhesives, acrylic-based heat resistant adhesives, thermoset adhesives, high-temperature polyurethane adhesives or a combination thereof. In some embodiments the thermometer cradle 160 may be wrapped with thermal resistant tape. In various embodiments the thermal resistant tape may include an overlay of silicone material.

In many aspects, the design of the one or more attachment mechanisms 230 may be optimized for robustness to withstand the typical movements conducted with tongs 100 during use, ensuring that the thermometer cradle 160 remains stably affixed during the manipulation of items 410. In another set of embodiments, the one or more attachment mechanisms 230 may be designed to be discreet, minimizing any impact on the overall profile and handling of the tongs 100, while still maintaining a secure attachment of the thermometer cradle 160.

In several embodiments, the detachable thermometer 150 may be designed to be removably secured within the thermometer cradle 160 wherein the thermometer cradle 160 may be affixed to the tongs 100. In some aspects, the thermometer 150 may include a temperature probe 152 and a digital display 154. In various embodiments the detachable thermometer 150 may be inserted and/or clipped into the cradle 160. In various embodiments clipping and/or inserting the detachable thermometer 150 into the thermometer cradle 160 may allow the detachable thermometer 150 to be stably positioned during use.

In various embodiments, the detachable thermometer 150 may be removed from the thermometer cradle 160 permitting independent use of the detachable thermometer 150 from the tongs 100. In several aspects, the user may disengage the detachable thermometer 150 by applying a gentle force to a release mechanism. In various aspects the release mechanism may be a part of the thermometer cradle 160. In certain aspects the user may disengage the detachable thermometer 150 by manipulating a securing component on the thermometer 150 itself. In several aspects incorporating a release mechanism for the detachable thermometer 150 may allow for the convenient cleaning of the thermometer 150 and/or the tongs 100.

In certain embodiments, the detachable thermometer 150 may be configured to interface with the thermometer cradle 160 in a manner that ensures a secure fit when the detachable thermometer 150 is positioned therein. In some aspects, the thermometer cradle 160 may include an interior contour matching an exterior profile of the detachable thermometer 150, such that when the detachable thermometer 150 is clipped into the thermometer cradle 160, the matching geometries may create a frictional engagement. In certain embodiments the frictional engagement may create a snug fit. In several embodiments the snug fit between the detachable thermometer 150 and the thermometer cradle 160 may prevent inadvertent dislodgement of the detachable thermometer 150 during the usage of the tongs 100.

In various embodiments, the detachable thermometer 150 may be configured to engage with the thermometer cradle 160 using one or more retention mechanisms. In several embodiments the one or more retention mechanisms may be designed to provide a secure yet releasable attachment. In several aspects the one or more retention mechanisms may include a resilient clip or latch on the thermometer cradle 160. In certain aspects the one or more retention mechanisms may engage a corresponding notch and/or recess on the detachable thermometer 150. In certain embodiments upon inserting the detachable thermometer 150 into the thermometer cradle 160, an audible and/or tactile click may indicate that the 150 may be properly seated and/or secured. In certain aspects the one or more retention mechanisms may allow for easy removal of the detachable thermometer 150 from the thermometer cradle 160 by the user.

In some embodiments, the cradle 160 may be designed to enable rapid attachment and/or detachment of the thermometer 150. In certain aspects, the rapid attachment and/or detachment mechanism may include features such as a quick-release mechanism. In some aspects the rapid attachment and/or detachment mechanism may include a lever and/or a button that when pressed or shifted may detach the thermometer 150 from the thermometer cradle 160 or securely attach the detachable thermometer 150 to the thermometer cradle 160.

In other aspects, a magnetic alignment system may be utilized, allowing the thermometer 150 to be easily placed into or removed from the cradle 160 with minimal effort. In various aspects, the rapid attachment and/or detachment mechanism may allow the attaching and/or detaching to be performed comfortably and efficiently, reducing the time and effort required by the user.

In several embodiments, the thermometer cradle 160 may include a retracting mechanism which may be configured to enable the temperature probe 152 of the detachable thermometer 150 to be inserted into one or more items 410 for temperature measurement. In certain aspects, this retracting mechanism may include a spring-loaded assembly within the cradle 160 that, upon actuation, may extend the temperature probe 152 downward through an aperture 162 situated at the base of the cradle 160. In some embodiments, the actuation may be initiated manually by a user through a button located on the cradle 160. In some embodiments, the actuation may be initiated manually by a user through a lever located on the cradle 160. In some embodiments, the actuation may be initiated manually by a user through a button located on the tongs 100. In some embodiments, the actuation may be initiated manually by a user through a lever located on the tongs 100. In some embodiments the actuation may allow for the controlled extension and retraction of the temperature probe 152.

In other embodiments, the retracting mechanism may be configured to operate automatically, where the insertion of the detachable thermometer 150 into the cradle 160 engages a switch and/or a sensor that activates the mechanism. In various aspects, the automated extension of the temperature probe 152 may be synchronized with the closing action of the tongs 100, such that as the tong ends 140 grasp one or more items 410, the temperature probe 152 may be simultaneously inserted into the one or more items 410 to obtain a temperature reading.

In various embodiments, the retracting mechanism within the thermometer cradle 160 may be equipped with a locking mechanism which may fix the temperature probe 152 in an extended position. In some aspects, the locking mechanism may prevent accidental retraction of the probe 152 during use. In certain embodiments, the locking mechanism may be released automatically when the tongs 100 release the one or more items 410. In various aspects the locking mechanism may be released manually through a release mechanism. In some aspects releasing the locking features may allow the temperature probe 152 to retract back into the thermometer cradle 160. In certain embodiments retracting the temperature probe 152 back into the thermometer cradle 160 may protect the temperature probe 152 from damage and/or contamination when not in use. In some aspects, the retracting mechanism may allow for the temperature probe to be extended or retracted relative to the tong ends. In various embodiments, the retracting mechanism may be operated manually and/or automatically to extend or retract the temperature probe. In other aspects, the retracting mechanism may assist in protecting the temperature probe when the thermometer is not in use.

In certain embodiments, the detachable thermometer 150 may include a digital display configured to provide a visual readout of the temperature measurements. In various aspects the detachable thermometer 150 and the digital display may be configured to provide additional information including but not limited to cooking time elapsed and/or remaining, weight measurements, humidity levels, cooking presets, doneness levels, battery life/power status, connectivity status, alerts and notifications, current date and/or time, calibration information, food safety warnings, elapsed time warnings, user customizations, Bluetooth/wi-fi signal strength, environmental conditions, error messages, multiple probe readings, heating/cooling rate, or a combination thereof.

In certain embodiments the detachable thermometer 150 may include a power button for activation and deactivation of the detachable thermometer 150. In certain aspects the detachable thermometer 150 may include one or more buttons to select between Celsius and Fahrenheit temperature units. In other aspects, the detachable thermometer 150 may include one or more buttons to hold the temperature reading. In certain aspects the detachable thermometer 150 may include a visual indicator 180. In certain embodiments the visual indicator 180 may signal the operational state of the thermometer 150.

In certain embodiments, the body of the detachable thermometer 150 may contain electronic components that may control the operation of the temperature probe and/or the display. In some aspects, the electronic components may include a power source and circuitry for processing temperature data.

In some embodiments, the detachable thermometer 150 may be composed of materials suitable for culinary use, such as food-grade stainless steel or heat-resistant plastics. In several aspects, the materials selected for the tongs 100 may ensure durability and resistance to heat and corrosion.

Figure 2:
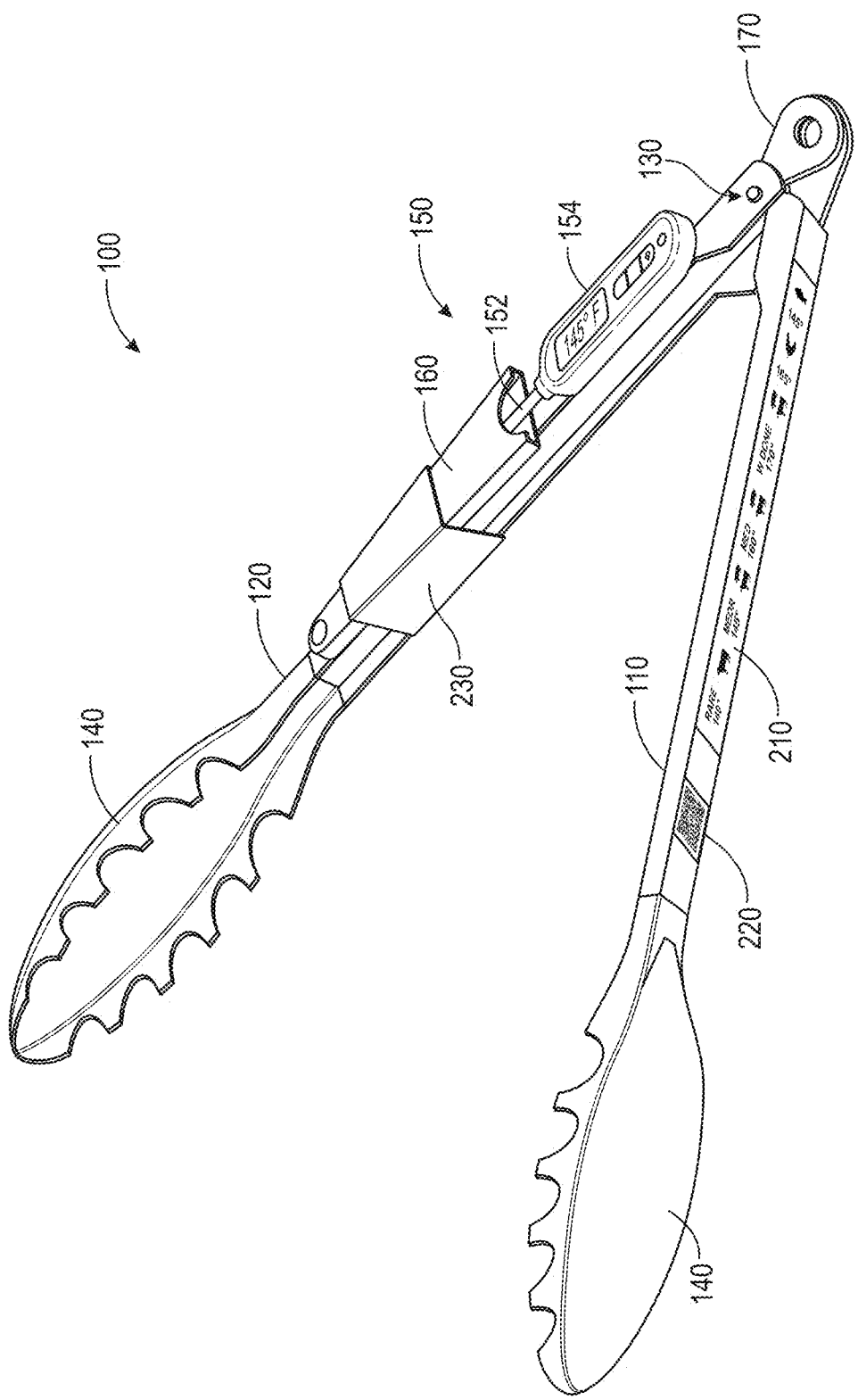
FIG. 2 shows an isometric view of one embodiment of the present disclosure.

FIG. 2 provides an isometric view of the present disclosure. In several aspects, the tongs 100 may include indicia 210 on the first arm 110 and/or the second arm 120 and/or the detachable thermometer 150 and/or the thermometer cradle 160. In various aspects the indicia 210 may facilitate user interaction. In some embodiments the indicia 210 may be configured to display recommended temperatures for a variety of one or more items 410. In certain aspects the indicia 210 may be configured to provide users with convenient temperature references during cooking and/or grilling activities. In certain embodiments the indicia 210 may be configured to provide users with convenient temperature reference data during use in a variety of other fields as described above. In certain aspects the indicia 210 may contribute to a seamless interaction between the user and the tongs, offering valuable guidance and relevant information during culinary tasks in different embodiments.

In several aspects, the tongs 100 may include a user-readable code 220 on the first arm 110 and/or the second arm 120. In various aspects the user-readable code 220 may facilitate user interaction. In some aspects, the user-readable code 220 may be implemented to convey additional information. In some aspects the user-readable code 220 may be configured to convey information including but not limited to cooking tips, recipe suggestions, safety guidelines or a combination thereof. In certain aspects the user-readable code 220 may contribute to a seamless interaction between the user and the tongs, offering valuable guidance and relevant information during culinary tasks in different embodiments.

User-readable code 220 may be a Quick Response code (QR code), which is a two-dimensional barcode consisting of black and white patterns that encode data such as text or URLs, readable by devices like smartphone cameras. These devices read, view, or capture the code's image and use software to decode the binary patterns, which represent the data, into a digital format. QR codes may include error correction to remain functional even when partially obscured and support various encoding modes for different data types.

Artificial Intelligence (AI) can enhance QR code design by incorporating aesthetic features like logos or color schemes without compromising readability, optimizing the delicate balance between visual appeal and functionality. Upon scanning an ornamental QR code, the device's software interprets the encoded information, prompting actions such as launching a specific application, redirecting to a website, or initiating other digital functions integral to the user's experience.

In various aspects, the user-readable code 220 which may be integrated into the tongs 100 may provide an interface. In certain embodiments the user-readable code 220 may provide users context-specific information for use in environments detailed above. In some aspects the user-readable code 220 may be leveraged to provide users with a wide range of contextual information tailored to each specific application listed above. A person having ordinary skill in the art will appreciate additional uses including but not limited to those listed above. In certain embodiments the user-readable code 220 may offer access to a range of contextual information tailored to including but not limited to detailed usage instructions, safety guidelines, procedural demonstrations, environmental data, creative inspirations, cooking tips, recipe suggestions, instructional content, technical specifications, maintenance guidelines, troubleshooting assistance, or a combination thereof tailored to the specific use.

In various aspects, the thermometer cradle 160 may incorporate indicia 210 and or a user-readable code 220. In certain aspects the one or more attachment mechanisms 230 may incorporate indicia 210 and/or user-readable code 220. In various aspects the indicia 210 and/or user-readable code 220 may provide instructions for attaching and detaching the thermometer. In some aspects, the user-readable code 220 may convey information related to thermometer maintenance, calibration procedures, battery replacement, or a combination thereof.

Figure 3:
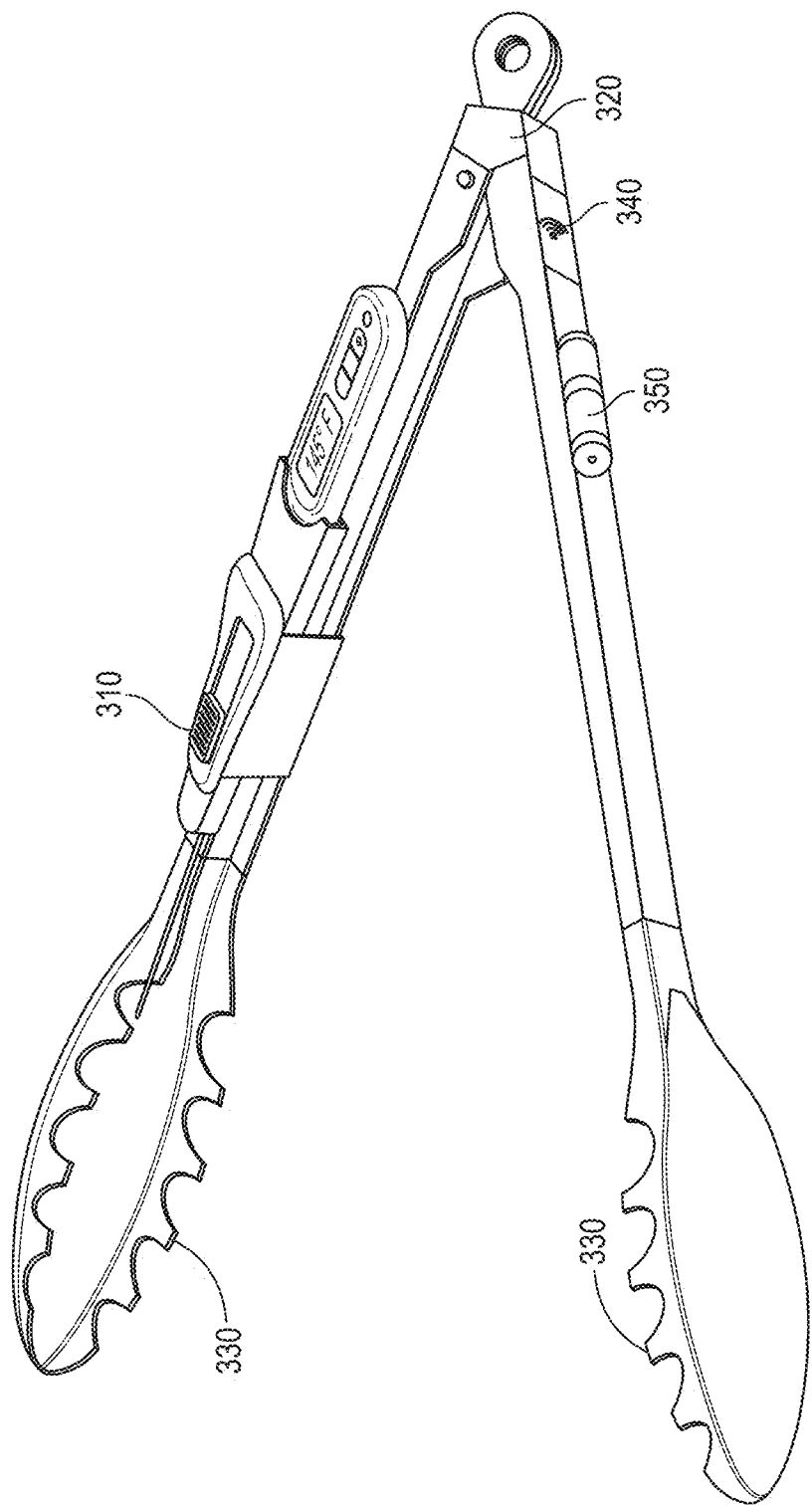
FIG. 3 shows an isometric view of one embodiment of the present disclosure.

FIG. 3 provides an isometric view of the present disclosure. In several aspects, the tongs 100 may include an integrated digital scale 320 which may be configured to provide an output indicative of the weight of the one or more items 410 held by the tongs 100. In certain embodiments the integrated digital scale may include a weight sensor. In various aspects the integrated digital scale 320 may be positioned on or near the first arm 110 and/or the second arm 120 and/or the hinge 130 of the tongs 100 to facilitate accurate weight measurement.

In some embodiments, the integrated digital scale 320 may be incorporated within or adjacent to the locking mechanism 170 of the tongs 100. In various aspects, the integrated digital scale 320 may activate when the tongs 100 are in a locked position and holding one or more items 410. In some aspects the integrated digital scale 320 may be engaged only when the tongs 100 are in a locked position. In various aspects the user may grip one or more items 410 using the one or more gripping elements 330 of the tong ends 140 on the tongs 100. In various aspects the tongs 100 may be locked in the closed position which may enable the tongs 100 to securely grasp the one or more items 410. In certain aspects, the weight of the one or more items 410 held by the tongs 100 may be measured using sensors embedded near the locking mechanism 170.

In other embodiments, the weight sensor and/or the integrated digital scale 320 may be positioned along the first arm 110 and/or the second arm 120 of the tongs 100. In various aspects the weight sensor and/or the integrated digital scale 320 may be embedded within the first arm 110 and/or the second arm 120. In other aspects, the weight sensor and/or the integrated digital scale 320 may be located in a distal position of the tongs 100. In various aspects, the weight sensor and/or the integrated digital scale 320 may be positioned near one or more of the tong ends 140. In other aspects, the weight sensor and/or the integrated digital scale 320 may be positioned in one or more of the tong ends 140. In other aspects, the weight sensor and/or the integrated digital scale 320 may be located in a proximal position of the tongs 100. In various aspects, the weight sensor and/or the integrated digital scale 320 may be located near the hinge 130 of the tongs 100. In one embodiment, as shown in FIG. 3, the weight sensor and/or the integrated digital scale 320 may be positioned between the hinge 130 and the locking mechanism 170. In various aspects, the weight sensor and/or the integrated digital scale 320 may be constructed from heat resistant. In certain aspects the weight sensor and/or the integrated digital scale 320 may include a calibration mechanism.

As shown in FIG. 3, the tongs 100 may include bidirectional wireless communication 340 functionality. In some embodiments, the thermometer 150 may be capable of bidirectional wireless communication 340. In various aspects, the bidirectional wireless communication 340 may enable the thermometer 150 to transmit data including, but not limited to, temperature readings from the temperature probe 152, to an external computing device. In several embodiments the thermometer 150 may be configured to receive data from the external computing device. In various aspects the data may include, but is not limited to, control commands, alerts, messages, warnings, configuration settings or a combination thereof. In some aspects the thermometer 150 may further include a digital display 154 for presenting information to a user. In various embodiments the digital display 154 may show data transmitted by the external computing device, as well as temperature readings obtained by the temperature probe 152.

As shown in FIG. 3, the tongs 100 may include a user-readable code 220 located on at least one of the first arm 110, the second arm 120, or the thermometer cradle 160. In many embodiments, the user-readable code 220 may be used to facilitate the pairing of the thermometer 150 with the external computing device to establish the wireless communication 340. In various aspects the external computing device may include a digital application platform. In some embodiments the wireless communication 340 may utilize standard communication protocols to enhance compatibility with a variety of external devices.

In several aspects the wireless communication 340 may facilitate the sharing of additional data, such as weight readings, timing information, alerts, or messages between the thermometer 150 and the external computing device. In some embodiments this interactivity may provide a user with an enhanced cooking experience by allowing remote monitoring and adjustment of cooking parameters.

In certain embodiments, the thermometer 150 may be equipped with a wireless communication module to enable the transmission and reception of data. In some embodiments, the wireless communication module may be embedded within the thermometer 150. In various aspects, the thermometer 150 may include a temperature probe 152 capable of capturing temperature readings. In several aspects, the thermometer 150 may further comprise a digital display 154, which may display temperature readings obtained from the temperature probe 152 and/or information received from an external computing device.

In other embodiments, the thermometer 150 may contain a power source, such as a battery, which may provide the necessary energy to power the wireless communication module and/or the digital display 154. In many embodiments, the thermometer 150 may incorporate a microcontroller unit (MCU) that may control the operation of the wireless communication module, process the data from the temperature probe 152, and manage the data exchange with the external computing device.

In certain aspects, a user-readable code 220 may be affixed to a surface of the detachable thermometer 150 or any surface of the tongs 100, facilitating device pairing and establishing a wireless communication link with the external computing device using standard communication protocols. In certain aspects, a user-readable code 220 may be affixed to the first arm 110 of the detachable thermometer 150. In certain aspects, a user-readable code 220 may be affixed to the second arm 120 of the detachable thermometer 150. In certain aspects, a user-readable code 220 may be affixed to the detachable thermometer 150 of the detachable thermometer 150. In certain aspects, a user-readable code 220 may be affixed to the thermometer cradle 160 of the detachable thermometer 150. In certain aspects, a user-readable code 220 may be affixed to the locking mechanism 170 of the detachable thermometer 150.

In some embodiments, the thermometer 150 may be enabled to share various data types, including but not limited to temperature readings from the temperature probe 152, weight readings from the tongs 100, alerts, or a combination thereof, and receive communications from the external computing device. In various embodiments the user-readable code 220 may provide an interactive user experience.

In certain embodiments, the thermometer 150 may include a variety of electronic components to facilitate wireless communication and functional capabilities. In some aspects, the thermometer 150 may include a rechargeable battery that can be replenished through ports including but not limited to USB or USB-C connection. In some aspects the ports may allow for the thermometer's firmware updates and data transfer to a computer or other devices.

In various embodiments, the thermometer 150 may feature an integrated circuit (IC) for wireless communication, which may encompass technologies such as Bluetooth, Wi-Fi, NFC, or Zigbee, enabling connectivity with a range of external devices for data sharing and remote functionality. In several aspects, the thermometer 150 may be equipped with a microcontroller (MCU) that processes input from the temperature probe 152, manages the display output, orchestrates communication with external devices or a combination thereof.

In other embodiments, the thermometer 150 may include additional electronic parts such as a light-emitting diode (LED) or an organic light-emitting diode (OLED) for visual indicators 180, providing status updates or alerts to the user. In many aspects, the thermometer 150 may incorporate sensors beyond the temperature probe, such as humidity or pressure sensors, to deliver more data regarding the cooking environment.

In certain aspects, the thermometer 150 may include an audio output component, such as a speaker or buzzer, which may emit audible alerts or notifications based on the data received or the temperature readings. In some embodiments, the thermometer 150 may offer haptic feedback capabilities, providing tactile notifications to the user through vibrations.

In various embodiments, the thermometer 150 may be designed to accept various power sources, such as coin-cell batteries for a compact design, standard AAA or AA batteries, or an external power supply when positioned within a charging cradle or dock.

In certain embodiments, the thermometer 150 may incorporate heat-resistant materials as described above to maintain the integrity and functionality of the electronic components when exposed to high temperatures. For example, the thermometer 150 may include a housing constructed from thermally insulative materials, such as high-temperature thermoplastics or silicone, which protect the internal electronic components, like the microcontroller unit (MCU), wireless communication module, and power source, from heat damage.

In some aspects, the temperature probe 152, which directly contacts hot environments, including hot food and/or hot cooking surfaces, may be fabricated from heat-resistant metals or alloys, such as stainless steel, which can withstand prolonged exposure to high temperatures without degrading. Various embodiments may feature thermal barriers or shielding strategically placed within the thermometer 150, providing additional layers of protection to sensitive electronic parts such as the rechargeable battery, ports (USB, USB-C), and display components.

In several aspects, circuitry within the thermometer 150, including but not limited to the integrated communication ICs and any additional sensors, may be coated or treated with heat-resistant conformal coatings to prevent thermal-related failures. In other embodiments, the LED or OLED visual indicators 180, audio output components, and haptic feedback mechanisms may be designed to operate effectively in high-heat environments.

In certain embodiments, the thermometer 150 may feature a low-light visibility enhancement system. In some aspects, the low-light visibility enhancement system may be designed to augment visibility in dimly lit environments. In some embodiments, the visual indicator 180 on the thermometer 150 may indicate the operational state of the detachable thermometer 150. In some aspects the visual indicator 180 may incorporate materials that emit light, including but not limited to phosphorescent or luminescent compounds. In various aspects the compounds may be readily detected by a user in low-light conditions.

In various aspects, selected features of the present disclosure may be treated with glow-in-the-dark materials. These materials may absorb and store light energy, later releasing it to enhance visibility in dark settings, thereby aiding users in locating and handling the thermometer 150 during low-light use. In certain aspects portions or all of the thermometer cradle 160 and/or the indicia 210 and/or the user-readable code 220 may be treated with glow-in-the-dark materials.

In several embodiments, the digital display 154 of the thermometer 150 may be equipped with backlighting. In certain aspects the backlighting may illuminate the display. In several aspects backlighting the digital display 154 may allow readability of temperature and other information conveyed on the screen without the necessity for external light sources.

In other embodiments, the temperature probe 152 may be marked with indications that specify correct insertion depths into one or more items 410 being manipulated by the tongs 100. In some aspects the markings may be fashioned from materials that are visible in low-light circumstances, such as iridescent or reflective paints or coatings. In some embodiments the materials visible in low-light circumstances may facilitate accurate placement of the probe by the user when ambient light is insufficient.

In many embodiments, the tongs 100 and/or the detachable thermometer 150 may integrate a combination of low-light visibility enhancement features. In various embodiments the tongs 100 and/or the detachable thermometer 150 may include a combination of visual indicators, glow-in-the-dark treatments, backlighting of displays, marked temperature probes or a combination thereof to improve the usability of the tongs 100 with the thermometer 150 in a range of lighting conditions.

As shown in FIG. 3, the tongs 100 may be equipped with an integrated light source 350. In various embodiments the integrated light source 350 may be positioned on various parts of the tongs such as the first arm 110, the second arm 120, the thermometer 150, the thermometer cradle 160, or the locking mechanism 170, to provide illumination in low-light conditions.

In some embodiments, the integrated light source 350 may serve to illuminate the work area, enabling users to better observe one or more items 410 and working surfaces when ambient light is reduced. In some aspects the positioning of the integrated light source 350 may be configured such that the integrated light source 350 casts light in a direction that improves visibility while operating the tongs 100.

In various aspects, the integrated light source 350 may serve to enhance the visibility of the thermometer's digital display 154. In some embodiments the integrated light source 350 may be configured to back-illuminate or edge-light the display area. In certain embodiments the integrated light source 350 may allow temperature readings and/or other digital outputs to be easily readable in dark environments.

In several embodiments, the integrated light source 350 may be designed to be energy-efficient, making use of LED technology and/or other low-power consumption light-emitting elements. In other embodiments, the integrated light source 350 may be activated manually via a switch or button, or automatically through the use of ambient light sensors that detect low-light conditions and activate the light source 350, as necessary.

In many embodiments, the integrated light source 350 may be shielded or diffused to provide a soft, even light that minimizes glare and shadows. In some embodiments the shielding and/or diffusing may provide users a clear view of the one or more items 410 and or the operational surfaces. In certain embodiments, the integrated light source 350, along with the low-light visibility enhancement features, may be crafted from heat-resistant materials.

In various embodiments the tongs 100 may include a thermometer 150 which may include a user-readable code 220. In various aspects the user-readable code 220 may be affixed to the tongs 100 including the first arm 110 and/or the second arm 120 and/or the thermometer cradle 160. In some aspects the user-readable code may facilitate the initiation of wireless communication 340 with an external computing device. In certain embodiments the user-readable code 220 may be strategically positioned to ensure ease of access and scanning by the external computing device.

In several aspects scanning the user-readable code 220 with the external computing device may provide access to a digital resource. In various embodiments the digital resource may be hosted on an application platform. In various aspects the application platform may offer a variety of content related to the use and functionality of the tongs 100. In various embodiments the content accessed may include, but not be limited to, cooking instructions, safety guidelines, recommended cooking parameters such as temperatures and/or times, or a combination thereof. In various embodiments the thermometer 150 may integrate with a comprehensive application platform via the user-readable code 220. In some embodiments scanning the user-readable code 220 may grant users access to digital resources on the application platform.

In some aspects the thermometer 150, in conjunction with the application platform, may allow for the transmission of real-time data to the external computing device. In some embodiments the data transmitted may include temperature readings, weight measurements from an integrated digital scale 320, timing information, or a combination thereof. In various aspects the user-readable code 220 may serve as a means to establish a bidirectional communication channel whereby the thermometer 150 may receive configuration settings and/or control commands from the external computing device.

In various embodiments the tongs 100 and/or the first arm 110 and/or the second arm 120 and/or the thermometer 150 and/or the thermometer cradle 160 may feature a user-readable code 220. In some embodiments the user-readable code 220 may be configured as a barcode, a QR code, an RFID tag, an NFC element, or any other machine-readable code capable of storing information for retrieval by an external computing device. In some embodiments the selected user-readable code 220 may be determined based on factors such as the desired range of accessibility, the amount of data to be encoded, and/or the compatibility with anticipated user devices. In certain aspects the user-readable code 220 may be affixed in a manner that is durable and resistant to environmental factors encountered during the use of the tongs 100, such as high temperatures, moisture, and typical cleaning processes.

In some aspects, the user-readable code 220 may allow for accessing digital resources and/or enhancing user 810 interaction. In some aspects, the user-readable code 220 may allow for integration with a non-transitory computer-readable medium. In some aspects, the non-transitory computer-readable medium may provide instructions for connecting and/or interacting with digital components of the tongs 100. In some aspects, the tongs may allow for wireless communication capabilities. In some aspects, the wireless communication may include transmitting data and/or receiving commands. In some aspects, the wireless communication may occur using Bluetooth. In some aspects, the tongs 100 may include provisions for an integrated light source and/or a low-light visibility enhancement system. In some aspects, the digital integration of the tongs 100 through the user-readable code may include a comprehensive application platform. In some aspects, the comprehensive application platform may include recipes, cooking guides, community engagement, personalization based on live temperature and/or weight data, dietary goals, and/or interaction with other smart kitchen devices.

In several embodiments upon scanning the user-readable code 220 with an external computing device, the user-readable code 220 may be configured to initiate the launch of a specific application residing on the external computing device. In certain embodiments this application may be equipped to receive and process weight data originating from the integrated digital scale 320 and/or temperature data from the thermometer 150.

In some aspects the application may be designed to provide an interactive content experience to the user. In some embodiments the interactive content experience may be determined by data received from the tongs 100 including but not limited to weight and temperature data. In various embodiments the interactive content experience may include prompts, guidelines, suggestions offered to the user or a combination thereof. In certain aspects the application may incorporate user-input criteria including but not limited to personal preferences, dietary restrictions, specific cooking goals or a combination thereof. In some embodiments the user-input criteria may provide a customized interactive content experience.

Figure 4:
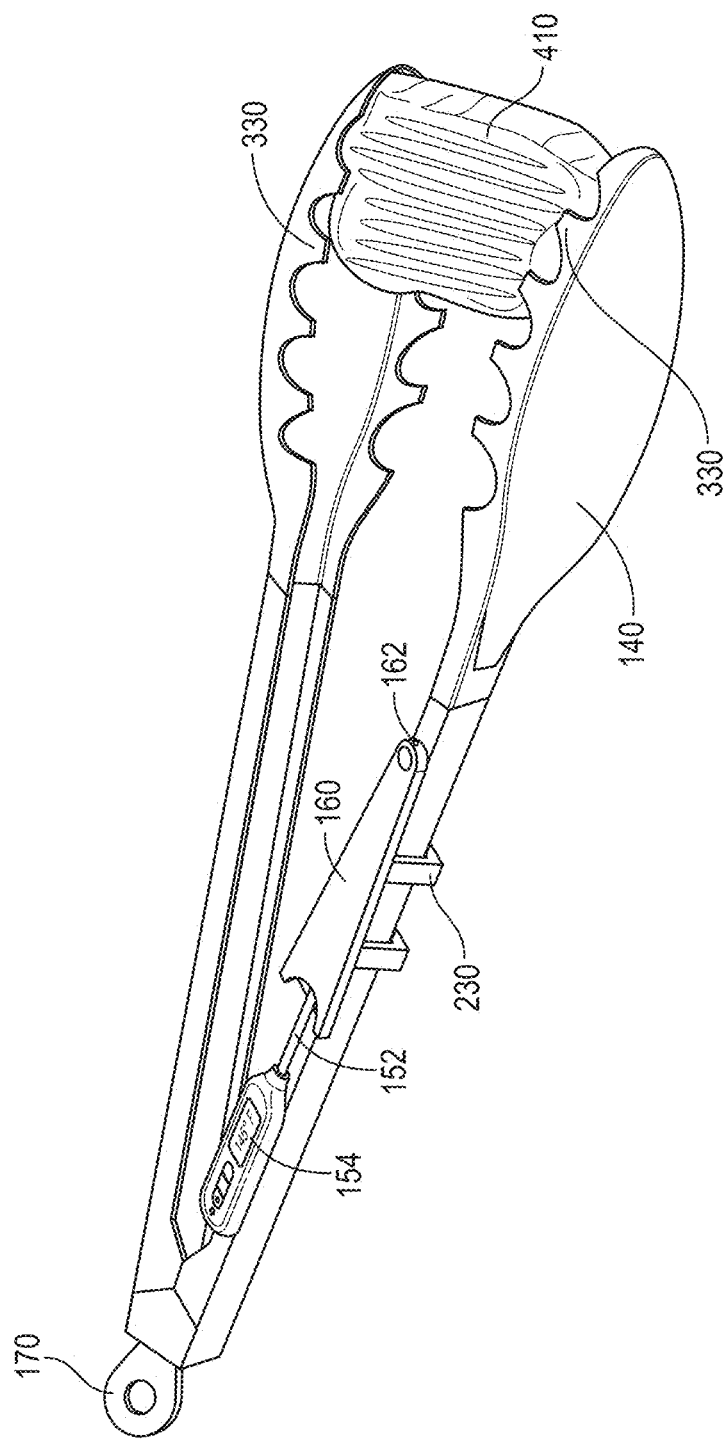
FIG. 4 shows an isometric view of one embodiment of the present disclosure.

In certain embodiments FIG. 4 illustrates an isometric view of tongs 100, wherein tong ends 140 are equipped with one or more gripping elements 330. The one or more gripping elements 330, resembling a set of teeth, are crafted from a material that provides the necessary durability and thermal resistance to withstand the conditions of typical culinary use.

In several embodiments the gripping elements 330 are strategically shaped to interlock effectively when tongs 100 are clamped, thereby securing one or more items 410, which may include foods such as meats. The interlocking nature of gripping elements 330 ensures the stable handling of one or more items 410 that possess irregular surfaces or that demand a stronger grip to prevent slipping or accidental release during cooking or serving processes.

In some embodiments the gripping elements 330 are depicted as engaging with one or more items 410, showing the ability of tongs 100 to maintain a firm hold on one or more items 410, wherein the one or more items may include food. This gripping action is enabled through the precision-engineered design of the gripping elements 330, which may include specific angles, curves, and points that optimize the clamping force and surface contact with one or more items 410.

In various aspects integrated digital thermometer 150, housed in thermometer cradle 160, is prominently featured in FIG. 4, positioned in such a way as to provide easy visibility and access to temperature readings from digital display 154. This positioning is carefully considered to ensure that the thermometer 150 can measure the temperature of one or more items 410 being held without impeding the functionality of tongs 100.

In certain aspects the integration of thermometer 150 into thermometer cradle 160 in FIG. 4 illustrates the seamless incorporation of digital temperature measurement capabilities with the mechanical functionality of tongs 100. The incorporation of thermometer 150 within this design does not compromise the structural integrity or ergonomic use of tongs 100, thereby enhancing the practicality of the kitchen utensil.

Figure 5:
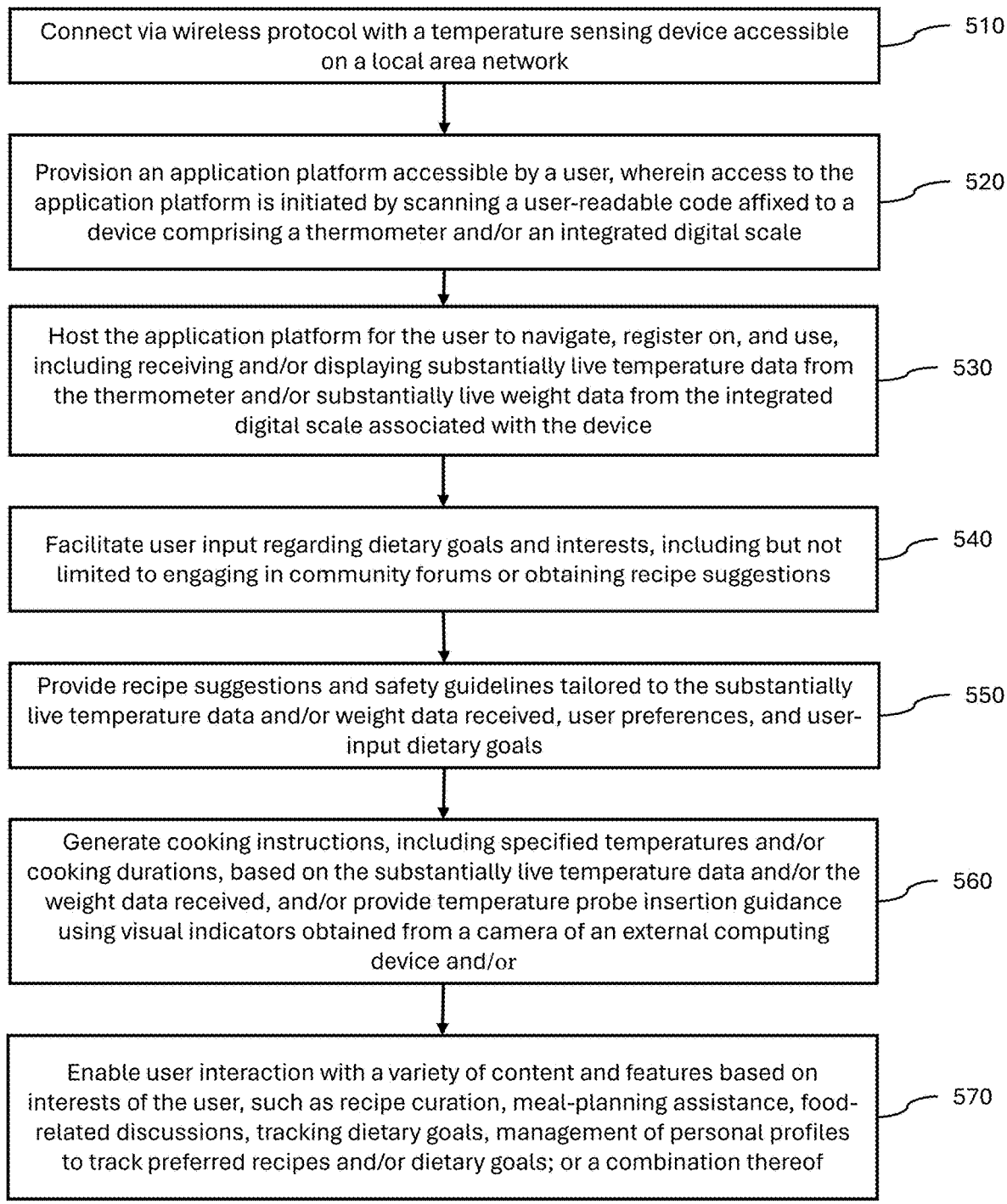
FIG. 5 depicts a block diagram of a data processing in an example software application provisioning interactive functionality with a device in accordance with certain embodiments.

In various aspects, this disclosure provides a method for using a multi-functional utensil with temperature sensing and digital interactive features. Possible steps of the method are shown in FIG. 5. Step one 510 of this method may provide for connecting via a wireless protocol with a temperature sensing device accessible on a local area network. In some embodiments, the process begins with the establishment of a wireless connection between a wireless communications system, connected to a processor, and a temperature sensing device accessible on a local area network. This may include the use of wireless communication standards such as Wi-Fi or Bluetooth to facilitate the secure, efficient exchange of data between devices.

Step two 520 of the method may provide for the instructions stored on the computer-readable medium that may further facilitate the provisioning of an application platform. In some embodiments, the application platform may be accessible by a user. In some embodiments, access to the application platform may be initiated by scanning a user-readable code 220 affixed to a device which includes the thermometer 150 and/or the integrated digital scale 320. In some embodiments after connecting, the processor may initiate the application platform, which a user may access by scanning a user-readable code 220 affixed to a device that includes a thermometer 150 and/or an integrated digital scale 320. In some embodiments provisioning may involve setting up the necessary software infrastructure to support application functionalities, including user authentication processes and user interface components.

In step three 530 of the method the application platform may be hosted for the user to navigate, register on, and use, and may receive and/or display substantially live temperature data from the thermometer 150 and/or substantially live weight data from the integrated digital scale 320. In some embodiments the application platform may be hosted for the user to navigate, register, and use, which may involve backend hosting services and frontend delivery to the user's device, enabling real-time interaction with substantially live temperature and/or weight data from a thermometer 150 and/or integrated digital scale 320, respectively.

In step four 540 of the method, the software may facilitate user input regarding dietary goals and interests, including engagement in community forums or obtaining recipe suggestions. In some embodiments the platform may facilitate user input regarding dietary goals and interests, allowing users to engage in community forums or obtain recipe suggestions. In some embodiments this may be supported by the implementation of form inputs, data validation techniques, and server-side logic for processing and storing user preferences.

In step five 550 of the method the software may provide recipe suggestions and safety guidelines tailored to the substantially live temperature data and/or weight data received, user preferences, and user-input dietary goals. In some embodiments based on the live data received and user inputs, the application platform may use database queries to present personalized recipe suggestions and safety guidelines, utilizing complex algorithms and/or user data to tailor content to individual preferences and goals.

In step six 560 of the method the software may generate cooking instructions, including specified temperatures and/or cooking durations, based on the substantially live temperature data and/or the weight data received, and/or provide temperature probe 152 insertion guidance using visual indicators 180 obtained from a camera of an external computing device. In some embodiments the processor may generate cooking instructions with specified temperatures and/or durations based on the received data. In some embodiments the processor may provide guidance for inserting a temperature probe 152 via visual indicators from a camera on an external computing device, using image recognition and processing techniques to aid the user.

In step seven 570 of the method the software may enable user interaction with a variety of content and features based on the interests of the user, such as recipe curation, meal-planning assistance, food-related discussions, tracking dietary goals, and management of personal profiles to track preferred recipes and/or dietary goals. In some embodiments the platform may enable user interaction with content and features based on interests. In some embodiments this may involve the integration with content management systems for recipe curation, meal planning assistance, and tracking dietary goals, as well as interfaces for managing personal profiles.

In certain embodiments the software integrated into the device may facilitate wireless connectivity between the thermometer 150 and the integrated digital scale 320 with an application platform through a local area network. In several aspects this software may be stored on a non-transitory computer-readable medium, which, when executed by a processor, enables the thermometer 150 and the integrated digital scale 320 to transmit substantially live temperature data and substantially live weight data, respectively.

In certain embodiments the tongs 100 may be utilized to measure weight data via integrated digital scale 320. In some embodiments the integrated digital scale 320 may function to assess the weight of one or more items 410 being grasped by tongs 100. In certain embodiments the weight data collected by integrated digital scale 320 may then be transmitted to an external computing device via bidirectional wireless communication 340.

In several embodiments the tongs 100 may include a thermometer 150, which may include a temperature probe 152 capable of generating temperature data. In certain embodiments the thermometer 150 may further include a digital display 154 for presenting temperature readings directly on the device. In some aspects the temperature data may be communicated to an external computing device through bidirectional wireless communication 340.

In some embodiments a user-readable code 220 may be present on the device, such as etched on thermometer cradle 160, engraved on first arm 110, second arm 120, or displayed on another suitable component. In various embodiments user-readable code 220 may be affixed to tongs 100 by means of a high-temperature resistant sticker. In various aspects the sticker may be designed to endure the temperatures typically encountered in cooking environments or any of the other environments described above without degradation or loss of functionality. In some embodiments user-readable code 220 may be incorporated into tongs 100 using a durable heat-resistant paint. The paint may be applied directly onto the surface of first arm 110 or second arm 120 or the thermometer cradle 160, ensuring visibility and scanability even under extreme cooking conditions. In certain embodiments user-readable code 220 may be embedded into a high-temperature resistant composite material that forms part of tongs 100, such as within comfort grip or any suitable portion of the tongs that is readily accessible for scanning. In several embodiments user-readable code 220 might be etched or engraved directly into the metal or material composing tongs 100. Such a method would provide a permanent and tamper-proof method of affixing user-readable code 220 to the device. In various aspects user-readable code 220 may be presented as a part of one or more attachment mechanisms 230 designed to securely attach user-readable code 220 to tongs 100, allowing for the possibility of replacement or updating of the code. In various aspects when scanned by an external computing device, the user-readable code 220 may be configured to initiate or launch a dedicated application on the external computing device.

In various aspects the dedicated application on the external computing device, once activated by user-readable code 220, may be configured to receive the weight data from integrated digital scale 320 and/or the temperature data from thermometer 150. Inn some aspects upon acquiring the data, the application may provide an interactive content experience. In some embodiments the interactive content experience may include, but is not limited to, culinary guidance, feedback, and suggestions based on the weight and temperature data of one or more items 410 or based on user-input criteria.

In some aspects the application may further use the temperature data and/or weight data to alert users of optimal cooking times, suggest recipes, or offer storage advice for foods. In various aspects the application might customize content, such as providing dietary information, accounting for user preferences or dietary restrictions input by the user.

In certain aspects the interactive content experience may be augmented by an array of features within the application, including timers, alerts, historical tracking of temperature and/or weight data for food, or a combination thereof. In certain embodiments this may allow users to improve their cooking methods or replicate successful cooking sessions by referring to recorded data.

In several aspects the interactive content experience may include social sharing options, enabling users to share their culinary experiences, recipes, or cooking techniques with a community or on social media platforms.

In some embodiments the instructions stored on the computer-readable medium may further facilitate the provision of an application platform. In certain embodiments the application platform may be accessible by a user. In some embodiments access to the application platform may be initiated by scanning a user-readable code 220 affixed to a device includes the thermometer 150 and/or the integrated digital scale 320. In several embodiments the application platform may be hosted for the user to navigate, register on, and use, including receiving and/or displaying substantially live temperature data from the thermometer 150 and/or substantially live weight data from the integrated digital scale 320 associated with the device.

In some aspects the software may facilitate user input regarding dietary goals and interests, including engagement in community forums or obtaining recipe suggestions. In various aspects the software may provide recipe suggestions and safety guidelines tailored to the substantially live temperature data and/or weight data received, user preferences, and user-input dietary goals. In some aspects, the software may generate cooking instructions, including specified temperatures and/or cooking durations, based on the substantially live temperature data and/or the weight data received, and/or provide temperature probe 152 insertion guidance using visual indicators 180 obtained from a camera of an external computing device. Moreover, the software may enable user interaction with a variety of content and features based on the interests of the user, such as recipe curation, meal-planning assistance, food-related discussions, tracking dietary goals, and management of personal profiles to track preferred recipes and/or dietary goals.

In certain embodiments the software integrated into the device may facilitate wireless connectivity between the thermometer 150 and the integrated digital scale 320 with an application platform through a local area network. In several aspects this software may be stored on a non-transitory computer-readable medium, which, when executed by a processor, enables the thermometer 150 and the integrated digital scale 320 to transmit substantially live temperature data and substantially live weight data, respectively.

In certain aspects the application platform may further provide recipe suggestions, portion information, caloric information, conversations related to cooking and dietary goals; or a combination thereof. In some aspects the features provided by the application platform may enhance the user experience by offering personalized content based on user preferences and/or input criteria.

In some embodiments the application platform may facilitate interactive features, including but not limited to, personalized recommendations and/or community engagement. In various aspects the interactive features may include collaborative and/or informative environments for users of the device.

In various embodiments the thermometer 150 may integrate with a comprehensive application platform via the user-readable code 220. In some embodiments scanning the user-readable code 220 may grant users access to digital resources on the application platform, the digital resources including but not limited to curated recipes, detailed cooking guides, and functionalities designed to foster community engagement among users.

In certain embodiments the application platform may offer personalization features that tailor the cooking experience to individual user needs. In several aspects these personalization features may utilize live data from the thermometer 150, the live data including but not limited to temperature readings, weight measurements from an integrated digital scale 320, user inputs, dietary goals, personal preferences, or a combination thereof.

In certain aspects the tongs 100, in cooperation with the thermometer 150, may be designed to interface with a non-transitory computer-readable medium that contains instructions for establishing connectivity. In various embodiments this connectivity may involve linking the thermometer 150 with a local network, thus enabling interactive cooking experiences. In various embodiments the live data tracking facilitated by the software and connectivity may provide users with a platform to monitor cooking progress, adjust settings in real-time, and participate in a connected community of other users.

In certain aspects, these embodiments and aspects may facilitate a comprehensive user experience, capitalizing on the interactivity and connectivity between tongs 100 and the external computing device, thereby enhancing the utility and versatility of the cooking device represented by tongs 100.

In some aspects, the user interface may include a detailed website interface including categorized protein options and/or recipe suggestions.

Figure 6:
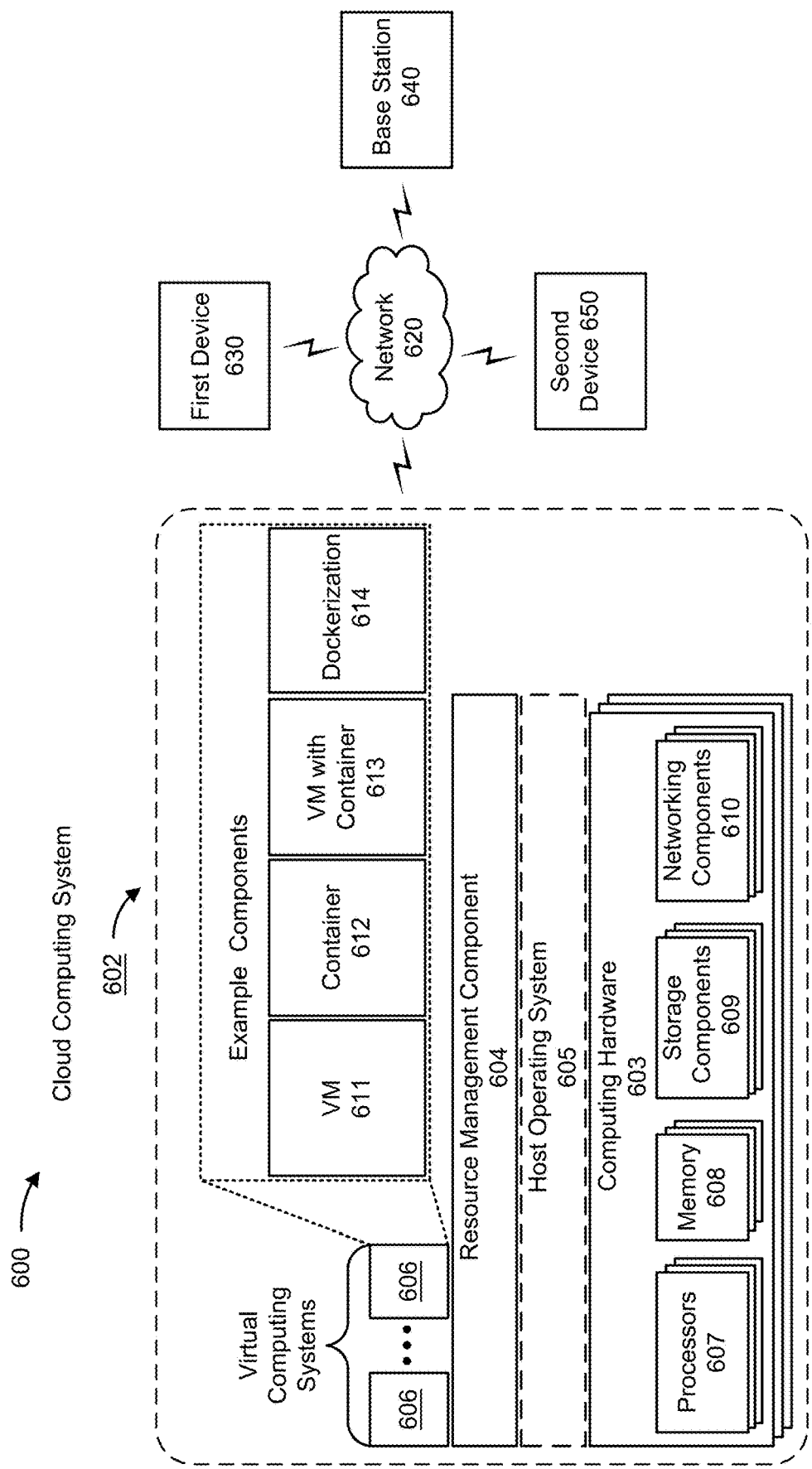
FIG. 6 is a diagram of an example environment in which systems and/or methods described herein may be implemented.
Figure 7:
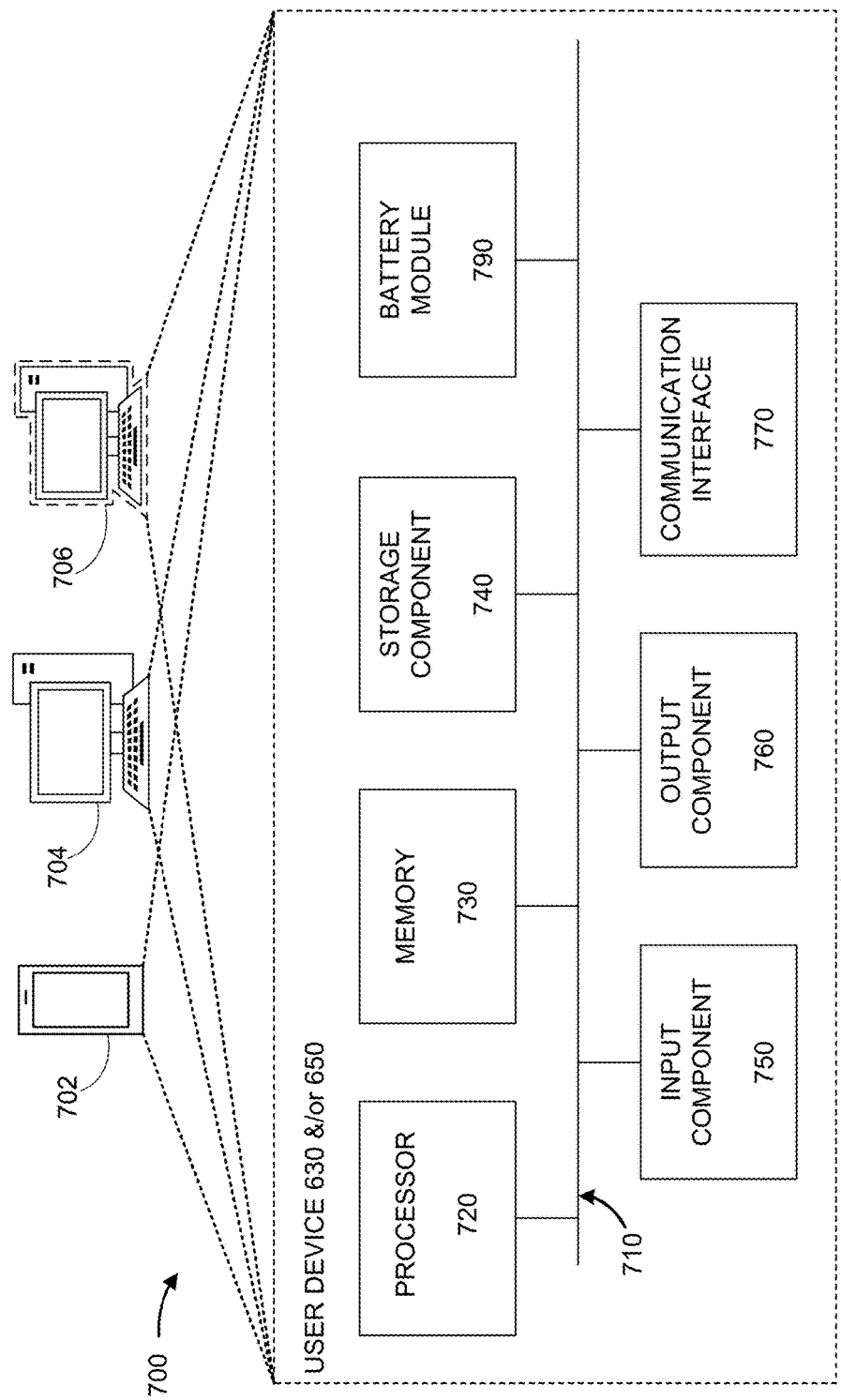
FIG. 7 is a diagram of components of a test device, according to an example of the present disclosure.

With reference to the figures and in particular, with reference to FIG. 6 and FIG. 7, these figures are example diagrams of data processing environments in which illustrative embodiments may be implemented. FIG. 6 and FIG. 7 are only examples and are not intended to assert or imply any limitation with regard to the environments in which different embodiments may be implemented. A particular implementation may make many modifications to the depicted environments based on the following description.

FIG. 6 is a diagram of an example environment 600 in which systems and/or methods described herein may be implemented. As shown in FIG. 6, the environment 600 may execute within a cloud computing system 602. The cloud computing system 602 may include one or more elements 603-613, as described in more detail below. As further shown in FIG. 6, the environment 600 may include a network 620, a first user device 630, and/or a base station 640. Devices and/or elements of the environment 600 may interconnect via wired connections and/or wireless connections. It is important to note that first user device 630, as described herein, is a user device which may be used by the first user and/or the second user. In the later case, when it is used by the second user, user device 630 may be called a second user device 630. For purposes of convenience in reading this description, the embodiment of the user device 630 as a first user device will be described, but it should be understood as interchangeably termed "second user device" at least for the purposes of the disclosures of FIG. 6 and FIG. 7.

The cloud computing system 602 includes computing hardware 603, a resource management component 604, a host operating system (OS) 605, and/or one or more virtual computing systems 606. The resource management component 604 may perform virtualization (e.g., abstraction) of the computing hardware 603 to create the one or more virtual computing systems 606. Using virtualization, the resource management component 604 enables a single computing device (e.g., a computer, a server, and/or the like) to operate like multiple computing devices, such as by creating multiple isolated virtual computing systems 606 from the computing hardware 603 of the single computing device. In this way, the computing hardware 603 can operate more efficiently, with lower power consumption, higher reliability, higher availability, higher utilization, greater flexibility, and lower cost than using separate computing devices.

The computing hardware 603 includes hardware and corresponding resources from one or more computing devices. For example, the computing hardware 603 may include hardware from a single computing device (e.g., a single server) or from multiple computing devices (e.g., multiple servers), such as multiple computing devices in one or more data centers. As shown, the computing hardware 603 may include one or more processors 607, one or more memories 608, one or more storage components 609, and/or one or more networking components 610. Examples of a processor, a memory, a storage component, and a networking component (e.g., a communication component) are described elsewhere herein.

The resource management component 604 includes a virtualization application (e.g., executing on hardware, such as the computing hardware 603) capable of virtualizing the computing hardware 603 to start, stop, and/or manage the one or more virtual computing systems 606. For example, the resource management component 604 may include a hypervisor (e.g., a bare-metal or Type 1 hypervisor, a hosted or Type 2 hypervisor, and/or the like) or a virtual machine monitor, such as when the virtual computing systems 606 may be virtual machines 611. In some embodiments the resource management component 604 may include a container manager, such as when the virtual computing systems 606 may be containers 612. In some implementations, the resource management component 604 executes within and/or in coordination with a host operating system 605.

A virtual computing system 606 includes a virtual environment that enables cloud-based execution of operations and/or processes described herein using computing hardware 603. As shown, the virtual computing system 606 may include a virtual machine 611, a container 612, a hybrid environment 613 that includes a virtual machine and a container, an environment which includes Docker-like filesystems or other possible Dockerization 614 with a VM or other computing hardware allocation, and/or the like. A virtual computing system 606 may execute one or more applications using a file system that includes binary files, software libraries, and/or other resources required to execute applications on a guest operating system (e.g., within the virtual computing system 606) or the host operating system 605.

The network 620 includes one or more wired and/or wireless networks. For example, the network 620 may include a cellular network, a public land mobile network (PLMN), a local area network (LAN), a wide area network (WAN), a satellite network, a private network, the Internet, and/or the like, and/or a combination of these or other types of networks. The network 620 enables communication among the devices of the environment 600.

First user device 630 may be possessed by a first user and includes one or more devices capable of receiving, generating, storing, processing, and/or providing information, as described elsewhere herein. First user device 630 may include a communication device and/or a computing device. For example, first user device 630 may include a wireless communication device, a mobile phone, a user equipment (UE), a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

In some aspects, the base station 640 may support, for example, a cellular radio access technology (RAT). In some aspects, the base station may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the base station 640. In some aspects, the first user device 630 may transfer traffic between the base station 640 (e.g., using a cellular RAT), one or more base stations (e.g., using a wireless interface or a backhaul interface, such as a wired backhaul interface), and/or a core network. In some aspects, the first user device 630 may provide one or more cells that cover geographic areas.

In some aspects, the second device 650 may be possessed by a second user and includes one or more devices capable of receiving, generating, storing, processing, and/or providing information, as described elsewhere herein. In some embodiments, the second device 650 may include a communication device and/or a computing device, and may be connected to, or embedded anywhere within, a vehicle or other equipment known to be utilized in the transportation industry. In some aspects, the second user device 650 may include a wireless communication device, a mobile phone, a vehicle computer system, a mobile printer, a calculator, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

In some aspects, the number and arrangement of devices and networks shown in FIG. 6 are provided as an example. In some aspects, in practice, there may be additional devices and/or networks, fewer devices and/or networks, different devices and/or networks, or differently arranged devices and/or networks than those shown in FIG. 6. In some aspects, two or more devices shown in FIG. 6 may be implemented within a single device, or a single device shown in FIG. 6 may be implemented as multiple, distributed devices. In some embodiments a set of devices (e.g., one or more devices) of the environment 600 may perform one or more functions described as being performed by another set of devices of the environment 600.

FIG. 7 is a diagram of components of first user device 630, according to an example of the present disclosure. In some aspects, the first user device 630 may include a bus 710, a processor 720, a memory 730, a storage component 740, an input component 750, an output component 760, a communication interface 770, battery module 790, or a combination thereof.

In some aspects, bus 710 includes a component that permits communication among the components of First user device 630. In some aspects, the processor 720 is implemented in hardware, firmware, or a combination of hardware and software. In some aspects, the processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 720 includes one or more processors capable of being programmed to perform a function. Memory 730 may include one or more memories such as a random access memory (RAM), a read only memory (ROM), and/or another type of dynamic or static storage device (e.g., a flash memory, a magnetic memory, and/or an optical memory) that stores information and/or instructions for use by processor 720. In some embodiments, a non-transitory computer-readable medium stores instructions that, when executed by a processor, cause the processor to perform various functions.

In some aspects, the storage component 740 may store information and/or software related to the operation and use of First user device 630. In some aspects, the storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

In some aspects, the input component 750 may include a component that permits first user device 630 to receive information, such as via user input (e.g., a touch screen display, a keyboard, a keypad, a mouse, a button, a switch, and/or a microphone). In some embodiments input component 750 may include a sensor for sensing information (e.g., a GPS component, an accelerometer, a gyroscope, and/or an actuator). In some aspects, the output component 760 may include a component that provides output information from first user device 630 (e.g., a display, a speaker, a user interface, and/or one or more light-emitting diodes (LEDs)). In some aspects, the output component 760 may include a display providing a GUI, such as an interface. In some aspects, the input component 750 and output component 760 may be combined into a single component, such as a touch responsive display, known as a touchscreen.

In some aspects, the communication interface 770 may include a transceiver-like component (e.g., a transceiver and/or a separate receiver and transmitter) that enables first user device 630 to communicate with other devices, such as via a wired connection, a wireless connection, or a combination of wired and wireless connections. In some aspects, the communication interface 770 may permit first user device 630 to receive information from another device and/or provide information to another device. In some aspects, the communication interface 770 may include one or more wireless communication systems, such as RFFEs (radio frequency front ends) with antennae circuitry and RF (radio frequency) filters, which may be variable power and/or purpose adapted for various communication frequencies, standards, links, and distances. In some aspects, the communication interface 770 may include an Ethernet interface, an optical interface, a coaxial interface, an infrared interface, an RF interface, a universal serial bus (USB) interface, a Wi-Fi interface, a cellular network interface, or the like.

In some aspects, the battery module 790 may be connected along bus 710 to supply power to processor 720, memory 730, and internal components of first user device 630. In some aspects, the battery module 790 may supply power during field measurements by first user device 630. In some aspects, the battery module 790 permits first user device 630 to be a portable integrated device for conducting field measurements of propagation delay in a RAN. A suitable architecture for the first user device 630 may include an embedded system design, where the battery module 790 provides power management capabilities. For instance, the device may integrate a power management integrated circuit (PMIC) that efficiently regulates voltage and current from the battery to various subsystems. The PMIC could include features like dynamic voltage scaling to adjust the power supplied to processor 720 and memory 730, optimizing the device's energy consumption during field measurements.

In some aspects, the first user device 630 may perform one or more processes described herein. In some aspects, the first user device 630 may perform these processes by processor 720 executing software instructions stored by a non-transitory computer-readable medium, such as memory 730 and/or storage component 740. In some aspects, the computer-readable medium may be defined herein as a non-transitory memory device. In some aspects, the memory device may include memory space within a single physical storage device or memory space spread across multiple physical storage devices. The processor 720 may be a multi-core system-on-a-chip (SoC) that executes software instructions for various measurement and analysis tasks. The memory 730, possibly a combination of volatile and non-volatile memory such as DRAM and flash memory, could be used to store both the operating system and measurement software. The storage component 740 might utilize solid-state drive (SSD) technology for enhanced data retrieval speeds essential for real-time processing.

In some aspects, the software instructions may be read into memory 730 and/or storage component 740 from another computer-readable medium or from another device via communication interface 770. In some aspects, when executed, software instructions stored in memory 730 and/or storage component 740 may instruct processor 720 to perform one or more processes described herein. In some embodiments hardwired circuitry may be used in place of or in combination with software instructions to perform one or more processes described herein. Thus, implementations described herein are not limited to any specific combination of hardware circuitry and software. Communication interface 770 could encompass various technologies such as LTE, Wi-Fi, and Bluetooth, supporting the software's ability to update and synchronize measurement data with external systems. The software, possibly written in a high-level language like C++ or Python, may be modular with components handling specific measurement tasks, and capable of being updated or replaced independently.

In some aspects, the number and arrangement of components shown in FIG. 7 are provided as an example. In practice, first user device 630 may include additional components, fewer components, different components, or differently arranged components than those shown in FIG. 7, 700. In some embodiments a set of components (e.g., one or more components) of first user device 630 may perform one or more functions described as being performed by another set of components of first user device 630. The design of the first user device 630 can be modular, allowing for easy replacement or upgrading of components such as the processor 720 or memory 730. This modularity could extend to the software design, with a microservices architecture enabling the distributed functioning of various tasks like data capture, analysis, and reporting.

In certain embodiments a non-transitory computer-readable medium may include instructions that, when executed by a processor, enable the processor to establish a connection via a wireless protocol with a temperature sensing device available on a local area network. In several embodiments the processor may provision an application platform that users can access upon scanning a user-readable code 220, which may be affixed to a device. This device may include, but is not limited to, a thermometer 150 and/or an integrated digital scale 320. The non-transitory computer-readable medium may contain an embedded operating system (e.g., Embedded Linux) that boots up the necessary drivers for the temperature sensing device. The processor could also support virtualization to run isolated application containers for different users or measurement jobs, enhancing security and efficiency.

In certain aspects the application platform may be hosted to allow users to navigate, register, and utilize the platform. The platform may include functionalities for receiving and displaying substantially live temperature data from thermometer 150 and/or substantially live weight data from the integrated digital scale 320. In some embodiments user input regarding dietary goals and interests may be facilitated, including enabling participation in community forums or obtaining recipe suggestions based on specific dietary preferences. The application platform might be developed using a full-stack JavaScript environment with Node.js on the server side and a front-end framework like React or Angular, providing a real-time, responsive user interface for interacting with the temperature and weight data.

In various aspects based on the substantially live temperature and/or weight data received, the platform may provide tailored recipe suggestions and safety guidelines.

These may be customized according to the user preferences and dietary goals input by the user. In several embodiments cooking instructions, which may include specified temperatures and/or cooking durations, may be generated based on the substantially live data from thermometer 150 and/or from integrated digital scale 320. In some embodiments the processor may provide guidance for inserting a temperature probe 152 using visual indicators that may be obtained from a camera of an external computing device. For real-time feedback on cooking processes, a WebSocket protocol could be used to maintain a persistent connection between the user's device and the application platform, allowing for instantaneous updates and alerts. The temperature probe guidance system could use augmented reality (AR) features, requiring a device with AR capability such as a smartphone or tablet with a camera and appropriate software libraries.

In some embodiments the non-transitory computer-readable medium may enable interaction with a variety of content and features. These features may cater to the interests of the user, such as facilitating recipe curation, providing meal-planning assistance, fostering food-related discussions, assisting in tracking dietary goals, and managing personal profiles to keep track of preferred recipes and/or dietary goals. The application's content and features could be developed using a content management framework like WordPress or Drupal, with custom plugins and themes designed to cater to the culinary-focused user interface and user experience.

In certain embodiments the non-transitory computer-readable medium may further cause the processor to alert users to critical cooking milestones. These alerts may be based on the substantially live temperature data received from thermometer 150. Technologically, this feature would be supported by an event-driven architecture where the software subscribes to updates or changes in temperature data from the thermometer 150. When the temperature data matches predefined milestones relevant to cooking processes, the software may trigger notifications. These may be implemented using push notification services and alert mechanisms in the application platform's client-side framework, which operates on a hybrid (web+local) architecture on the user's personal computing device. The event-driven architecture could be implemented using a publish/subscribe model with a message broker like RabbitMQ or Apache Kafka. This ensures that alerts are only sent when relevant events occur, reducing unnecessary processing and network traffic.

In several embodiments the non-transitory computer-readable medium may enable the application platform to display detailed cooking instructions and/or recipe suggestions. In several embodiments the detailed cooking instructions and/or recipe suggestions may include specific temperature and/or time recommendations for a variety of foods. Such recommendations may be dynamically adjusted based on the weight data received from the integrated digital scale 320 or depending on the type of food item 410 being cooked. Relational or non-relational databases may be utilized to store an extensive range of cooking instructions and recipes. These databases would include metadata linking ingredients, their associated weights, cooking times, and temperatures. The software may implement algorithms capable of adjusting these parameters in real time based on the live data from the digital scale 320 and thermometer 150. For the dynamic adjustment of cooking instructions, machine learning algorithms may be implemented to analyze the correlation between temperature and cooking times, adjusting recommendations based on data trends. These algorithms could run on the device or in the cloud, depending on the computational resources available.

In certain aspects the application platform may be further configured to access and display portion and/or caloric content information for one or more items 410 which may include foods. This information is retrieved based on the weight data sourced from integrated digital scale 320. Underlying this capability is a content management system (CMS) within the hybrid application architecture that stores nutritional information which associates food weight to caloric content. The platform may include Application Programming Interfaces (APIs) that facilitate seamless integration with third-party meal-planning and diet-tracking applications, enabling the sharing of data and creating a cohesive user experience. In some embodiments the platform may support communication protocols such as RESTful services to interface with smart kitchen devices. These protocols allow the application to monitor and control these devices, contributing to a connected and smart cooking environment. APIs for nutritional data retrieval might be RESTful, allowing third-party integration. The CMS could be interfaced with nutritional databases using standard data exchange formats like JSON or XML, providing the application with up-to-date information.

In some embodiments the non-transitory computer-readable medium may further allow the application platform to provide access to a community forum for culinary enthusiasts. This enables users to share experiences, information, and engage in cooking and dietary goal-related discussions. This feature relies on community-driven software modules that facilitate user-generated content management, moderation tools, and real-time interaction capabilities. In some aspects, leveraging machine learning algorithms and user engagement analytics, the software may predict user preferences for future meal planning and shopping list generation. These algorithms process historical data and collect dietary goals to refine and personalize the user experience. For shopping list generation, the system may include logic that compiles ingredients from selected recipes, correlates them with user dietary goals, and produces a consolidated list, which may be integrated with e-commerce platforms for direct purchasing options. To support the community forum, a database system like MySQL or MongoDB can store user-generated content. Integration of a machine learning framework, such as TensorFlow or PyTorch, could enable personalized user experiences by analyzing interaction patterns and preferences identification.

In many embodiments, the technologies employed to facilitate the functionalities described in this disclosure may involve a comprehensive software architecture that includes backend services for data processing, frontend services for user interaction, and middle-tier services to manage communication between devices and the application. In many aspects, the software architecture may leverage cloud services for scalability and real-time data analytics. In various aspects, the non-transitory computer-readable medium may enable the application to provide a rich, interactive, and connected cooking experience tailored to the individual user's preferences and dietary requirements. In this comprehensive software architecture, backend services could be hosted on cloud platforms like AWS or Azure, using their data processing and analytics capabilities. Frontend services may be delivered through Content Delivery Networks (CDNs) to ensure fast load times, while middle-tier services handle API requests and manage data flow.

Figure 8:
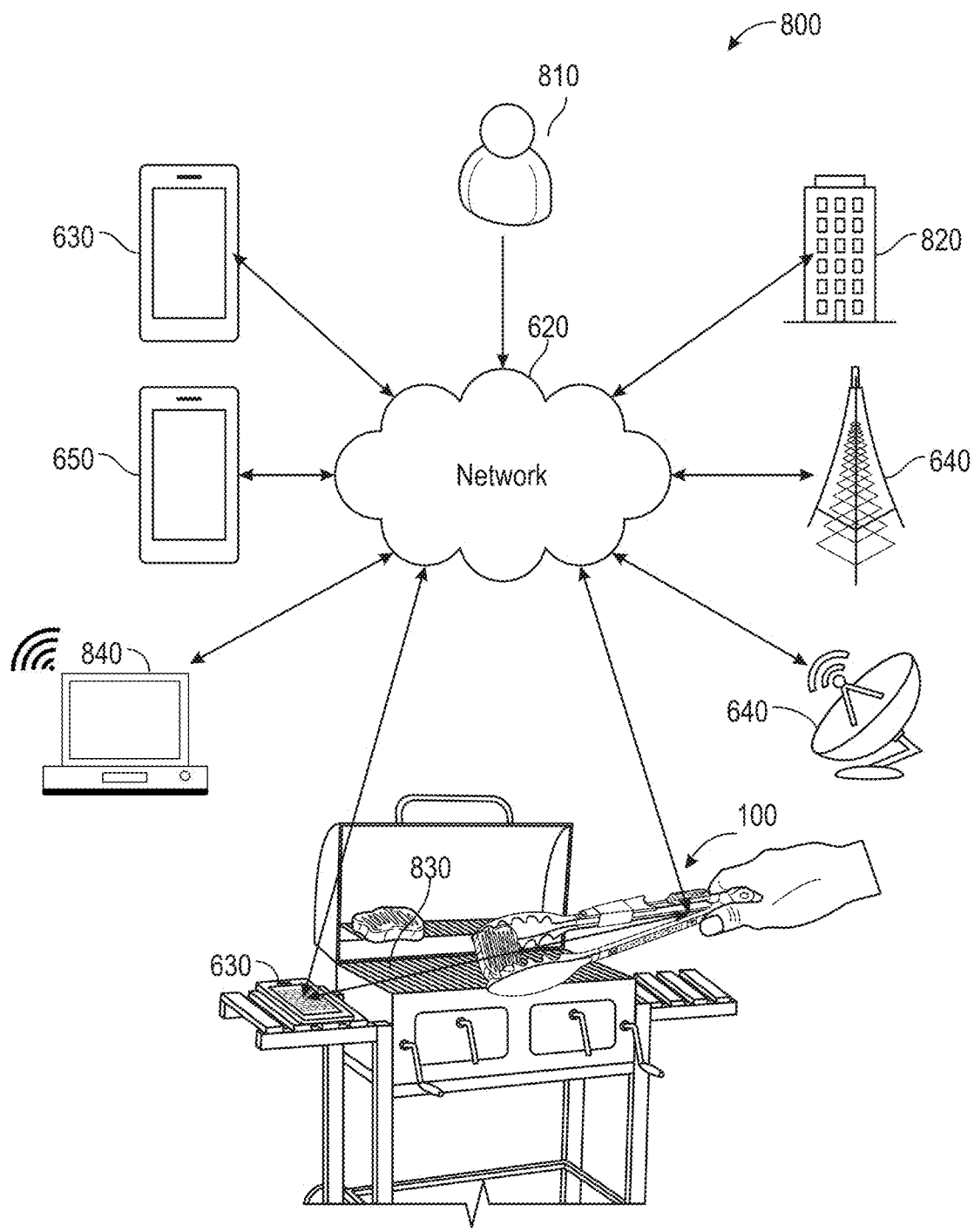
FIG. 8 depicts a sample technological environment in accordance with certain embodiments.

FIG. 8 illustrates an exemplary technological environment of the systems and software designed for a multifunctional utensil, featuring temperature sensing and digital interactive capabilities to support a variety of services, including culinary activities and heating operations. In various aspects the schematic provides an advanced networked environment that enables control and interaction with culinary-related hardware, such as interactive tongs 100 and a heating surface 830. In certain embodiments the central network 620 is depicted as the critical hub for coordinating data transmission and functionality across the integrated components within this comprehensive culinary ecosystem. The technological environment includes hardware interfacing through protocols supported by the central network 620, such as MQTT or CoAP, which are well-suited for IoT environments and can efficiently handle the data traffic from temperature sensing and other culinary devices.

In some embodiments a user 810 is depicted engaging with the system via a first device 630, which can encompass a range of personal computing devices capable of interfacing with the application platform. These devices may possess local storage capabilities and processing power to support a hybrid system architecture, including both cloud-based and local data processing. In some embodiments the range of personal computing devices may include but are not limited to smartphones, tablets, laptops, desktop computers, wearable devices, e-readers, personal digital assistants, portable media players, handheld gaming consoles, smart glasses, augmented reality headsets, convertible or 2-in-1 devices such as laptop/tablet hybrids, or a combination thereof. The first device 630 may support multiple operating systems and platforms, given its role in interfacing with various user devices. The application might be developed using cross-platform tools like Xamarin or Flutter to support a wide range of devices.

A second device 650, illustrated as a personal computing device, may represent additional user interfaces or smart appliances, including but not limited to culinary applications, with integrated wireless communications and electronic computing systems. In some embodiments these systems may function independently or in conjunction with the personal device of a user 810 to enhance the cooking experience. The second device 650 can be designed to integrate seamlessly with the first user device 630 and the central network 620, using standard interoperability protocols like AllJoyn or IoTivity, which facilitate device-to-device communication within the smart kitchen ecosystem.

In some embodiments the computer with a Wi-Fi symbol 840 signifies an additional node for wireless connectivity, enabling users to interact remotely with the central network 620 for various culinary purposes, such as recipe access or cooking monitoring. Wi-Fi symbol 840 represents not only standard Wi-Fi connectivity but also may symbolize the presence of a Wi-Fi mesh network capable of extending the range and improving the reliability of wireless connections within the culinary environment.

In some aspects a server host location 820 may serve as a cloud service provider or other commercial data host provider. In various aspects the server host location 820 may be collocated and/or co-owned by the user 810, providing flexibility in the data hosting arrangements that support the culinary network. In various aspects this may allow for scalable and accessible data storage options. Server host location 820 may employ distributed data storage solutions like blockchain to enhance security and reliability. For increased data throughput and reduced latency, edge computing capabilities might be integrated into the server infrastructure.

In certain aspects base station 640 may be connected to the network 620. In some aspects the base station 640 may be included within the ecosystem to provide dedicated connectivity solutions, ensuring reliable and consistent communication across devices. The base station 640 could be part of a Wireless Sensor Network (WSN) that interfaces with various sensors in the culinary environment, using a communication protocol stack optimized for low power consumption and high reliability, such as personal area networks like 6LoWPAN or other protocols like Zigbee IP.

In FIG. 8, the interactive tongs 100 are shown as directly connected to a cell phone placed on the side table of the heating surface 830, which is represented here as a grill. In some aspects the direct connection may be facilitated through wireless communication protocols such as Bluetooth, allowing the tongs, which may be equipped with sensors, to transmit culinary data to the user's device. In various aspects, the direct connection may include but is not limited to Wi-Fi Direct, Near Field Communication (NFC), Zigbee, Z-Wave, Infrared (IR), Ultra-Wideband (UWB), Ant/Ant+, Thread, or a combination thereof. In various aspects, the sensors may include but are not limited to temperature sensors, pressure sensors, proximity sensors, motion sensors, weight sensors, humidity sensors, pH sensors, optical sensors, chemical sensors, or a combination thereof. For the direct connection between interactive tongs 100 and the cell phone, Bluetooth Low Energy (BLE) could be implemented for its power-efficient communication, with the capability to switch to Wi-Fi or other protocols as required for higher data throughput.

In some aspects the ecosystem may support a hybrid architecture, which may include local data storage within the first device 630, as well as cloud storage through the server host location 820. In certain aspects this arrangement may offer a robust and adaptable infrastructure for managing culinary data, preferences, services, user interaction, or a combination thereof.

While a particular form of the invention has been illustrated and described, it will be apparent that various modifications can be made without departing from the spirit and scope of the invention. For example, each of the foldable sections and foldable locations independently may fold in the direction of another axis. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above.

The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A device comprising:
   tongs having a first arm and a second arm pivotally connected at a hinge, each arm terminating in a tong end;
   a thermometer comprising a temperature probe and a digital display;
   a cradle affixed to the device configured to receive the thermometer;
   the cradle including a retracting mechanism configured to extend and retract the temperature probe through an aperture;
   an integrated digital scale configured for measuring a weight of one or more items held by the tongs;
   wherein:
      the cradle is affixed to the device by one or more attachment mechanisms;
      the one or more attachment mechanisms provide a fixedly attached and heat-resistant connection;
      the one or more attachment mechanisms are adapted to accommodate varying sizes and shapes of the device; and
      the one or more attachment mechanisms include: a slotting mechanism, flexible fasteners, clips, staple devices, interlocking components, magnetic attachments, adjustable straps, adjustable bands, suction mechanisms, rail and groove systems, threaded fasteners, hook and loop fasteners, hinged clasps, socket and ball joints, spring clips, dovetail slides, latch systems, adhesives, or wrapping with thermal resistant tape.

2. The device of claim 1, wherein the tongs include a locking mechanism for maintaining a fixed position during use and wherein the thermometer is detachable.

3. The device of claim 1, wherein the tong end of the first arm and/or the second arm includes one or more gripping elements adapted to hold one or more items of various sizes and/or shapes without requiring manual pressure.

4. The device of claim 1, wherein the tongs are manufactured from a heat-resistant material suitable for use in various temperature conditions and/or are configured to be disassembled.

5. The device of claim 1, wherein at least one of the first arm or the second arm or the thermometer cradle includes indicia indicating recommended temperatures for a variety of items and/or a user-readable code.

6. The device of claim 5, wherein the thermometer is capable of bidirectional wireless communication with an external computing device for sharing data, including temperature readings, weight readings, timing information, alerts, messages, or a combination thereof;
   wherein the thermometer can receive control commands and configuration settings from the external computing device; and
   wherein the thermometer can transmit data to the external computing device.

7. The device of claim 6, further comprising the user-readable code affixed to the tongs and/or the cradle, wherein scanning the user-readable code with the external computing device provides access to a digital resource, the digital resource including an application platform with a variety of content.

8. The device of claim 6, wherein the user-readable code when scanned by the external computing device is configured to launch an application on the external computing device to receive weight data from the integrated digital scale and/or temperature data from the thermometer, and wherein the application provides an interactive content experience to a user based on the temperature data and/or the weight data received and/or user-input criteria.

9. The device of claim 5, further comprising a low-light visibility enhancement system, wherein the low-light visibility enhancement system is:
   a visual indicator for signaling an operational state of the thermometer;
   glow-in-the-dark materials applied to selected portions of the cradle and/or the indicia and/or the user-readable code; and/or
   backlighting for the digital display; or a combination thereof.

10. The device of claim 1, wherein the tongs and/or the cradle are ergonomically designed to accommodate different hand sizes, to facilitate rapid attachment and detachment of the thermometer, and wherein the tongs and/or the cradle include interchangeable hand pieces comprising material which provides slip resistance and thermal insulation.

11. The device of claim 1, wherein the device is manufactured using various manufacturing techniques including additive manufacturing.

12. The device of claim 1, wherein the integrated digital scale is configured to provide an output indicative of the weight of the one or more items held by the tongs, and wherein the integrated digital scale includes a weight sensor positioned on the first arm and/or the second arm and/or the hinge of the tongs to facilitate accurate weight measurement.

13. The device of claim 1, further comprising an integrated light source to provide illumination and/or enhance visibility in low-light conditions.

14. The device of claim 1, wherein the thermometer includes the temperature probe with markings to indicate an appropriate depth of insertion into an item for accurate temperature measurement.

* * * * *